(12) United States Patent
McWhite

(10) Patent No.: US 7,818,193 B1
(45) Date of Patent: Oct. 19, 2010

(54) SHIP STOWAGE AID ANALYSIS PROGRAM

(75) Inventor: James David McWhite, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1891 days.

(21) Appl. No.: 10/826,790

(22) Filed: Apr. 16, 2004

Related U.S. Application Data

(60) Provisional application No. 60/465,242, filed on Apr. 25, 2003.

(51) Int. Cl.
*G06F 9/44* (2006.01)
(52) U.S. Cl. .......................................................... 705/7
(58) Field of Classification Search ........................ None
See application file for complete search history.

(56) References Cited

U.S. PATENT DOCUMENTS

| | | | | |
|---|---|---|---|---|
| 3,162,168 | A * | 12/1964 | Ferris et al. | 114/72 |
| 4,630,561 | A * | 12/1986 | Franz et al. | 114/1 |
| 5,299,520 | A * | 4/1994 | Wilts | 114/56.1 |
| 5,388,541 | A * | 2/1995 | Dumas et al. | 114/74 R |
| 5,557,556 | A | 9/1996 | Shank | |
| 5,627,949 | A * | 5/1997 | Letcher, Jr. | 345/420 |
| 5,856,828 | A * | 1/1999 | Letcher, Jr. | 345/420 |
| 5,970,899 | A * | 10/1999 | Michaelson et al. | 114/85 |
| 6,105,525 | A * | 8/2000 | Rapeli | 114/72 |
| 6,378,110 | B1 | 4/2002 | Ho | |
| 6,480,992 | B1 | 11/2002 | Runyon | |
| 6,931,294 | B2 * | 8/2005 | Macy et al. | 700/98 |
| 7,467,073 | B2 * | 12/2008 | Nasr et al. | 703/6 |
| 2002/0026296 | A1 * | 2/2002 | Lohmann et al. | 703/1 |
| 2003/0093178 | A1 * | 5/2003 | Russell et al. | 700/217 |
| 2005/0150175 | A1 * | 7/2005 | Guigan | 52/36.1 |

OTHER PUBLICATIONS

Lee KY, Han SN and Roh M (Jul. 2002). Optimal Compartment Layout Design for a Naval Ship Using an Improved Genetic Algorithm. Marine Technology 39(3): 159-169.*

(Continued)

*Primary Examiner*—Romain Jeanty
*Assistant Examiner*—Brett Feeney
(74) *Attorney, Agent, or Firm*—Howard Kaiser

(57) ABSTRACT

Stowage requirements are estimated either in early stage design of a ship or in evaluation of an existing ship. Initialization data includes definition of one or more stowage aid types, definition of one or more storeroom types, description of stowage requirements associated with one or more different ship types, and enumeration of "compartment utilization factors" corresponding to each defined stowage aid type (e.g., in the form of one or more data matrices, each matrix corresponding to a stowage aid type). Once the data setup is completed, the number of storerooms needed to hold a given or estimated volume of stowage is determined. Space layout rules and the corresponding "compartment utilization factors" are applied to each selected stowage aid type, thereby determining the number of stowage aids required (and the associated stowage aid weights) as to each stowage aid type, and/or the total storage area required as to each storeroom type.

20 Claims, 15 Drawing Sheets

OTHER PUBLICATIONS

Advanced Surface Ship Evaluation Tool (ASSET) Ship Design Synthesis Programs Model/Simulation Submitted Dec. 15, 1996.*

Tan KT and Bligh TP (1998). A New Approach to an Integrated CAD Method for Surface Ship Design. Naval Engineers Journal. January. pp. 35-48.*

Wayne P. Hughes Jr. Source: Operations Research, vol. 50, No. 1, 50th Anniversary Issue (Jan.-Feb. 2002), pp. 103-111.*

Sebnem Helvacioğlu and Mustafa Insel (2002). Container Ship Accommodation Layout Design With Application of Expert Systems (ALDES) ITÜ Faculty of Naval Architecture and Ocean Engineering.*

Lee KH, Lee JK and Park NS (1997). Intelligent Approach to a CAD System for The Layout Design of a Ship Engine Room. Computers ind. Engng. 34(3): 599-608.*

Lee D and Lee KH (1999). An approach to case-based system for conceptual ship design assistant. Expert System with Applications. 16: 97-104.*

James David McWhite, "Early Stage Surface Ship Design—Shipboard Stowage System Requirement Estimation Program," American Society of Naval Engineers, ASNE Day 2002, Apr. 29-30, 2002, Arlington, Virginia (10 pages).

* cited by examiner

Determine the Gross Area Required to Store the Stowage Aid's Percentage of Volume of Stores

From FIG. 2C

↓

Determine the number of stowage aids needed to store the desired volume of material, by aid type Divide the volume of material needing to be stored in each stowage aid, by the net volume capable of being stored by the aid type chosen

↓

Find an estimate of the required stowage area needed by multiplying the number of stowage aids by the foot-print area of each aid ← Retrieve historical data on each stowage aid's length and width dimension

↓

Get the average storeroom compartment size and W/L ratio from historical data based upon chosen ship type indicator ← Retrieve historical data on SSCS storerooms average area and width to length ratios, by ship type, and by 1/3 longitudinal length location

| AREA GROUP | STOREROOM DESCRIPTION | LOAD WEIGHT GROUP |
|---|---|---|
| SSCS 1.3911 | AVN CONSUMABLE STOWAGE | LOADS ARE IN SWBS F26 |
| SSCS 1.3912 | AVN CONSUMABLE ISSUE | LOADS ARE IN SWBS F26 |
| SSCS 1.3922 | AVN ELECTRONIC REPAIR PARTS | LOADS ARE IN SWBS F26 |
| SSCS 1.3923 | AVN ORDNANCE REPAIR PARTS | LOADS ARE IN SWBS F26 |
| SSCS 1.394 | FLIGHT CLOTHING STOWAGE | LOADS ARE IN SWBS F16 |
| SSCS 1.397 | AVIATION SQUADRON STOWAGE | LOADS ARE IN SWBS F16 |
| SSCS 1.54103 | CARGO DRY PROVISIONS | LOADS ARE IN SWBS F62 |
| SSCS 1.54104 | CARGO FLAM LIQUID NON-FUEL | LOADS ARE IN SWBS F64 |
| SSCS 1.54107 | CARGO DRY CONSUMABLES | LOADS ARE IN SWBS F62 |
| SSCS 1.54112 | CARGO REPAIR PARTS | LOADS ARE IN SWBS F62 |
| SSCS 1.54121 | CARGO DRY BULK STOWAGE | LOADS ARE IN SWBS F62 |
| SSCS 1.54202 | CARGO CHILL PROVISIONS | LOADS ARE IN SWBS F62 |
| SSCS 1.54203 | CARGO FROZEN PROVISIONS | LOADS ARE IN SWBS F62 |
| SSCS 2.231 | CHILL PROVISIONS STOWAGE | LOADS ARE IN SWBS F31 |
| SSCS 2.232 | FROZEN PROVISION STOWAGE | LOADS ARE IN SWBS F31 |
| SSCS 2.233 | DRY PROVISION STOWAGE | LOADS ARE IN SWBS F31 |
| SSCS 2.34101 | MEDICAL & DENTAL STOWAGE | LOADS ARE IN SWBS F31 |
| SSCS 2.41002 | CLOTHING & SMALL STRS ISSUE | LOADS ARE IN SWBS F31 |
| SSCS 2.55 | FOUL WEATHER GEAR STOWAGE | LOADS ARE IN SWBS F32 |
| SSCS 2.62 | CBR DEFENSE EQUIP STOWAGE | LOADS ARE IN SWBS F32 |
| SSCS 3.7111 | FLAMMABLE LIQUID N0N-FUEL | LOADS ARE IN SWBS F32 |
| SSCS 3.712 | SPECIAL CLOTHING STOWAGE | LOADS ARE IN SWBS F31 |
| SSCS 3.7131 | SHIP CONSUMABLE STOWAGE | LOADS ARE IN SWBS F32 |
| SSCS 3.7132 | SHIP CONSUMABLE ISSUE | LOADS ARE IN SWBS F32 |
| SSCS 3.714 | SUPPLY DEPT STRMS (BULK) | LOADS ARE IN SWBS F32 |
| SSCS 3.74 | DECK DEPT STOWAGE | LOADS ARE IN SWBS F32 |
| SSCS 4.34203 | TRASH STOWAGE (BULK) | LOADS ARE N/A |

FIG. 3

| # | AID NAME | EMPTY WEIGHT | STOWAGE AID UTILIZATION FACTOR |
|---|---|---|---|
| 1 | A-DRAWER | 607.0 lbs | SAUF = 70.0% |
| 2 | B-DRAWER | 457.0 lbs | SAUF = 69.6% |
| 3 | B-BIN-36 | 169.0 lbs | SAUF = 52.9% |
| 4 | B-BIN-24 | 128.0 lbs | SAUF = 52.9% |
| 5 | Dry-BULK | 42.6 lbs/sq-ft | SAUF = 90.0% |
| 6 | Chill-BULK | 46.0 lbs/sq-ft | SAUF = 88.0% |
| 7 | Frozen-BULK | 48.4 lbs/sq-ft | SAUF = 88.0% |
| 8 | C-RACK | 890.7 lbs | SAUF = 57.4% |
| 9 | E-COUNTER | 483.5 lbs | SAUF = 32.4% |
| 10 | F-BIN | 166.0 lbs | SAUF = 46.5% |
| 11 | I-BIN | 418.0 lbs | SAUF = 66.7% |
| 12 | J-BIN | 198.0 lbs | SAUF = 64.9% |
| 13 | J-RACK-Aluminum | 198.0 lbs | SAUF = 62.6% |
| 14 | J-RACK-Steel | 553.0 lbs | SAUF = 62.6% |
| 15 | K-RACK-Aluminum | 205.0 lbs | SAUF = 66.8% |
| 16 | K-RACK-Steel | 594.0 lbs | SAUF = 66.8% |
| 17 | L-COUNTER | 153.4 lbs | SAUF = 47.7% |
| 18 | M-RACK | 1131.3 lbs | SAUF = 53.1% |
| 19 | MDS | 452.4 lbs | SAUF = 70.0% |
| 20 | MDS-Small Version | 401.9 lbs | SAUF = 70.0% |
| 21 | N-RACK | 1314.0 lbs | SAUF = 43.7% |
| 22 | O-BIN | 246.4 lbs | SAUF = 47.1% |
| 23 | R-RACK 4 shelf | 290.0 lbs | SAUF = 75.0% |
| 24 | R-RACK 6 shelf | 379.0 lbs | SAUF = 75.0% |
| 25 | S-BIN | 97.0 lbs | SAUF = 47.2% |
| 26 | S-RACK 4 shelf | 244.0 lbs | SAUF = 75.0% |
| 27 | S-RACK 6 shelf | 310.0 lbs | SAUF = 75.0% |
| 28 | T-RACK | 402.8 lbs | SAUF = 66.6% |
| 29 | PALLET- BULK | f(area, # strms) | SAUF = 90.0% |
| 30 | PALLET- BIN | f(area, # strms) | SAUF = 62.6% |
| 31 | ISLE-SAVER 3 shelf | 621.5 lbs | SAUF = 60.0% |
| 32 | ISLE-SAVER 4 shelf | 649.0 lbs | SAUF = 58.5% |
| 33 | USER DEFINED 1 | User Input, lbs | SAUF= User Input, % |
| 34 | USER DEFINED 2 | User Input, lbs | SAUF= User Input, % |
| 35 | USER DEFINED 3 | User Input, lbs | SAUF= User Input, % |

FIG. 4

| | |
|---|---|
| COMPARTMENT UTILIZATION FACTOR (CUF) | The storeroom net volume, divided by the storeroom gross volume, times the stowage aid utilization factor, and converted to a percentage by multiplying by 100. |
| STOWAGE AID UTILIZATION FACTOR (SAUF) | The stowage aid's net volume, divided by the gross volume occupied by the stowage aid, times the packing factor, and converted to a percentage by multiplying by 100. |
| PACKING FACTOR | The statistical average of the ratio of the material net volume to the stowage capacity of a particular stowage aid, as surveyed to exist in naval ships (Usually developed and reported by FOSAC for use in the U.S. Navy). |
| USABLE DECK AREA | The net arrangeable deck area of a shipboard storeroom compartment, bounded by the ship's shell deck edge and vertical bulkheads, taking into account losses of area due to bulkhead stiffeners, piping, wireways, insulation and vent ducts. |
| MATERIAL NET VOLUME | The actual volume of the material to be stored, including packaging material if the packing material is required for proper stowage. |
| STOREROOM GROSS VOLUME | The volume of the compartment within the boundaries of vertical bulkheads and the deck edge of shell plating intersections, from the deck to the maximum allowable material stowage height (e.g., 6.5 feet maximum allowed for most systems). |
| STOREROOM NET VOLUME | The volume of the compartment available for the material to be stored and any required stowage aids and required clearances and aisles. Calculated as the product of the usable deck area and the stowage height. |
| STOWAGE AID | Any piece of equipment or fittings used for stowage, including bins, drawer and shelf units, lockers, modular drawer stowage cabinets, reels, shelving, clips, jackrods and portable or telescopic battens with grating. |
| STOWAGE AID CAPACITY | The usable stowage volume provided by a stowage aid, divided by the gross volume (the stowage aid's foot print times the stowage aid's height) of the stowage aid. |
| STOWAGE HEIGHT | The clear height to which stores are to be stacked. Usually defined as the 6 feet and 6 inches above the deck or deck grating (notable exception being for refrigerated storerooms, where the height is 6 feet and 0 inches above the grating). However, a minimum of 6 inches clear space is required above bulk material, and the stowage height must not incorporate this clearance. For cargo storerooms, the stowage height is the height that provides the required clear space of 6 inches above the bulk stowage material and that is not to be less than 6 feet and 3 inches, which is required for headroom for surface ship personnel. |

FIG. 6

KSW PALLET STOWAGE SYSTEM

SPACESAVER STOWAGE SYSTEM

SHIP STOWAGE AID ANALYSIS PROGRAM

CROSS-REFERENCE TO RELATED APPLICATIONS

This application claims the benefit of U.S. Provisional Application No. 60/465,242, filed 25 Apr. 2003, inventor James David McWhite, entitled "Ship Stowage Requirements Estimation Method," incorporated herein by reference.

STATEMENT OF GOVERNMENT INTEREST

The invention described herein may be manufactured and used by or for the Government of the United States of America for governmental purposes without payment of any royalties thereon or therefor.

BRIEF DESCRIPTION OF THE COMPUTER PROGRAM LISTING APPENDIX

Incorporated herein by reference is a Computer Program Listing Appendix, setting forth inventive embodiments of computer source code. This Computer Program Listing Appendix is contained as text documents, Microsoft Word documents, and Visual Basic files that were created on Apr. 13, 2004 in a CD-R compact disc that is now situated in the application file. The CD-R compact disc contains three sub-directories entitled "SSAAP (Ver-3.0) Executable," "SSAAP (Ver-3.0) Formatted Source Code," and "SSAAP (Ver-3.0) VB-6 Source Code," said three sub-directories containing data files as enumerated in this paragraph. "SSAAP (Ver-3.0) Executable" contains one executable file, compatible with Microsoft-Windows Personal Computer (PC) operating systems, viz., SSAAP (Ver-3.0).exe (about 952 KB in size). "SSAAP (Ver-3.0) Formatted Source Code" contains seventeen files, in ASCII file format, of the source code behind the SSAAP Visual Basic Forms and Modules, as follows: StowageAid_frmAbout(frm).txt (about 6 KB in size); Aid_HELP (form).txt (about 44 KB in size); Ship_Form(frm).txt (about 68 KB in size); Ship_Options_Form(frm).txt (about 47 KB in size); SSCS_Printout(frm).txt (about 19 KB in size); INPUT_Form(form).txt (about 1 KB in size); Storeroom_Form(frm).txt (about 59 KB in size); USER_INPUT_FORM(form).txt (about 1 KB in size); UserDefinedAids(frm).txt (about 4 KB in size); AUXCUF(bas).txt (about 93 KB in size); AUXCUF2(bas).txt (about 37 KB in size); AUXCUF3(bas).txt (about 27 KB in size); AUXCUF4(bas).txt (about 27 KB in size); AUXDFT (bas).txt (about 158 KB in size); AUXSTOW(bas).txt (about 45 KB in size); AUXSTOW2(bas).txt (about 61 KB in size); Error(bas).txt (about 1 KB in size). "SSAAP (Ver-3.0) Formatted Source Code" also contains seventeen files, in MS Word file format, of the source code behind the SSAAP Visual Basic Forms and Modules (Including Graphic Images of the Forms), as follows: StowageAid_frmAbout(frm).doc (about 47 KB in size); Aid_HELP(form).doc (about 159 KB in size); Ship_Form(frm).doc (about 196 KB in size); Ship_Options_Form(frm).doc (about 157 KB in size); SSCS_Printout(frm).doc (about 86 KB in size); INPUT_Form (form).doc (about 52 KB in size); Storeroom_Form (form).doc (about 195 KB in size); USER_INPUT_FORM (form).doc (about 46 KB in size); UserDefinedAids (form).doc (about 54 KB in size); AUXCUF(bas).doc (about 251 KB in size); AUXCUF2(bas).doc (about 89 KB in size); AUXCUF3(bas).doc (about 75 KB in size); AUXCUF4 (bas).doc (about 70 KB in size); AUXDFT(bas).doc (about 357 KB in size); AUXSTOW(bas).doc (about 115 KB in size); AUXSTOW2(bas).doc (about 144 KB in size); Error (bas).doc (about 25 KB in size). "SSAAP (Ver-3.0) VB-6 Source Code" contains twenty files, compatible with Microsoft-Windows Personal Computer (PC) operating systems and associated with the Microsoft-Visual Studio (Ver-6) (as installed with service pack No. 5) Visual BASIC programming language, three of which are "Project Files," nine of which are "Forms," and eight of which are "Modules." The "Project Files" are as follows: STOWAGE SSAAP 3.vbp (about 2 KB in size); STOWAGE SSAAP 3.vbw (about 1 KB in size); Storeroom.ico (about 1 KB in size). The "Forms" are as follows: StowageAid_formAbout.form (about 11 KB in size); Aid_HELP.form (about 57 KB in size); Ship_Form.frm (about 101 KB in size); Ship_Options_Form.frm (about 68 KB in size); SSCS_Printout.frm (about 29 KB in size); INPUT_Form.frm (about 5 KB in size); Storeroom_Form.frm; (about 84 KB in size); USER_INPUT_FORM. (about 2 KB in size); UserDefinedAids.frm (about 13 KB in size). The "Modules" are as follows: AUXCUF.bas (about 94 KB in size); AUXCUF2.bas (about 37 KB in size); AUXCUF3.bas (about 27 KB in size); AUXCUF4.bas (about 27 KB in size); AUXDFT.bas (about 158 KB in size); AUXSTOW.bas (about 45 KB in size); AUXSTOW2.bas (about 61 KB in size); Error.bas (about 1 KB in size).

BACKGROUND OF THE INVENTION

The present invention relates to estimation of stowage requirements of a ship, more particularly to methodologies for determining ship stowage requirements such as involving numbers, volumes, weights and areas as pertain to storage compartments and stowage aids.

The United States Navy has developed historical and empirical estimates of stowage aid weights and storage compartment volumes needed to store many common ship stores. These estimates often relate to numbers of people or specific types of subsystems existing on typical naval vessels. Generally, the estimated stowage requirements are based on reports, or technical standards, that provide the current volume and related density of shipboard stowage, such as food (e.g., frozen, chill, dry) required per day for each type of crewmember onboard (e.g., officer, CPO, enlisted). Other associated accommodation stowage influences include medical supplies, special clothing, canned soda, and ship store condiments. Often stowage demands are based on mechanical systems which that require lubrication, such as the number and type of aircraft and small boats onboard.

Such stowage estimations are especially difficult to implement during the initial feasibility level review in the context of new ship design studies. The historical approach to determining needed storeroom areas on Navy ships is to double the footprint area of the total number of stowage aids anticipated based on the aforementioned stowage material data. The estimate found by this doubling method is often found to be insufficient when the shipboard stowage requirements are realized. Thus, according to current storage estimation methodologies, the storerooms are not maximized and are not reflective of real shipboard stowage conditions.

SUMMARY OF THE INVENTION

In view of the foregoing, it is an object of the present invention to provide an improved methodology for estimating storeroom sizes that are required for stowage of items onboard a ship.

It is another object of the present invention to provide an improved methodology for estimating stowage aid sizes (e.g., types, weights, and quantities) that are required for stowage of items onboard a ship.

In accordance with typical embodiments of the present invention, a method for estimating stowage requirements in terms of storeroom area and stowage aids comprises: (a) providing a database of extents of accommodativeness by rectangular storerooms with respect to at least one stowage aid type, wherein as to each stowage aid type the database indicates variation in the extents of accommodativeness by at least two rectangular storerooms having the same geometric area but different lengthwise-widthwise dimensions; and, (b) based on the database, relating an amount of stowage aids to a storeroom area that is accommodative of the stowage aids. According to many inventive embodiments, the relating includes one or more of the following: (i) selecting a storeroom's lengthwise-widthwise dimensions and finding the maximal extent of the selected storeroom area that is accommodative of stowage aids; (ii) selecting a storeroom's lengthwise-widthwise dimensions and type of stowage aid(s) used in said storeroom and finding the total volume of stores capable of being contained; (iii) selecting an amount of stowage aids and finding the minimal extent of storeroom area that is accommodative of the selected amount of stowage aids.

A typical computer program product in accordance with the present invention is for residence in memory of a computer wherein the computer program product is for evaluating what is required for storing items and comprises a computer useable medium having computer program logic recorded thereon. The computer program logic includes: (a) means for enabling access to information as to the capabilities of differently sized compartments to accommodate stowage aids, each compartment being characterized by an individual floor area and individual floor dimensions, the information including indication of different accommodative capabilities in at least two compartments that are characterized by the same individual floor area but different individual floor dimensions; and, (b) means for enabling determination of at least one relationship between a total amount of stowage aids and a total floor area accommodative of the total amount of stowage aids. According to many such inventive embodiments, the total amount of stowage aids is of said stowage aids of at least one selected type. The information pertains to each of at least one type of stowage aid. Each compartment is characterized by a portion of the individual floor area that is unsuitable for situation thereupon of the stowage aids. The different accommodative capabilities are associated with the respective natures of the corresponding unsuitable portions. The unsuitability is associated with (i) accessibility to the stowage aids in the compartment, and/or (ii) functional clearance of the stowage aids in the compartment.

Previous to the present invention, U.S. Naval ship designers have had to estimate the required stowage area/volume necessary to store items (e.g., spare parts, operating liquids, provisions, clothing, etc.) from a review of historical data pertaining to prior ship designs. All too often, these old approaches have greatly underestimated the required area/volume of storerooms, and have failed to adequately assisted in determining the sizes (e.g., weights) of associated stowage aid(s) (e.g., racks, bins, etc.) being utilized. Noteworthy in this regard is the traditional approach taken by the U.S. Navy's FOSSAC (Fitting Out and Supply Support Assistance Center; see DDS-672-1 "Calculation of Storeroom Capacities"), which involves the estimations of required surface ship naval storeroom areas based upon calculations of the amounts of stores that fit into set numbers and types of stowage aids. Taking the sum of the footprint area corresponding to the total number of stowage aids, and doubling it, yields the FOSSAC-recommended storeroom area required for early stage ship design. However, these traditional estimates tend to be significantly short in determining real shipboard stowage requirements.

A main premise of the present invention is that the number of stowage aids that can be stored in any rectangular compartment is directly associated with the compartment's length-to-width ratio (L/W). The ordinarily skilled artisan who reads this disclosure will readily understand that, in general, the present invention can be practiced using width-to-length (W/L) ratio definitions and/or length-to-width (L/W) ratio definitions, since W/L ratio and L/W ratio are mathematical inverses of each other. Taking into account such factors as stowage aid pullout requirements and access ways, long and thin storerooms can often accommodate a smaller number of stowage aids than can square or squarer storerooms of same or similar area. By tracking compartment width-to-length ratios (e.g., 0.1 to 1.0 in 0.1 intervals) for many different storeroom areas, the present inventor finds that almost all of the standard U.S. Navy stowage aid types will require a significantly greater arrangeable area than determined via the "doubling" assumption made by FOSSAC. A possible exception to this inventive rule is represented by the category of bulk stowage systems, which are even more efficient and generally require less than doubling of the sum of the stowage aids footprint areas.

The present invention's method and computer program product use information that tracks, by location (e.g., forward section, midship section, aft section), the available ship storeroom areas and shapes (L/W Ratio) for a set of various ship storeroom types as pertain to a set of various ship types (e.g., surface combatants, auxiliaries, carriers, amphibious, etc.). The present inventor has compiled data groups of realistic compartment sizes (areas) and shape constraints (W/L ratio) to evaluate the numbers of storage aids that need to be stored in these compartments.

The practitioner of the present invention achieves far better accuracy in the predictions of stowage aid sizes and ship storeroom deck areas that are required to store onboard supplies. The inventive practitioner can evaluate the satisfaction of stowage requirements by new or existing stowage aids or combinations thereof. The present invention succeeds, for instance, in predicting the required arrangeable deck area in accordance with storeroom type (e.g., provision, repair part, flammable liquid, etc.), taking into account such factors as stowage aid system inefficiencies and human interfacing requirements. Also notable among that which can be inventively determined is information as to the impacts of stowage aids (e.g., in terms of weight and volume) on the total ship design. The present invention is capable of predicting the weight impact of a stowage system, based on inventive determination of quantities of stowage aids required to store predetermined volumes of stores.

The present inventor has made, inter alia, the following general historical observations of ship architecture with regard to storeroom sizes and stowage efficiencies. Firstly, storeroom sizes tend to vary in accordance with ship types. Further, on each deck, storerooms tend to not take up the maximum available area that is physically configurable via subdivision. Hence, efficiency losses are associated with smaller sizes and greater numbers of storerooms, as compared with larger sizes and lesser numbers of storerooms. Inventive practice succeeds in better matching the realities of historical ship design practices, and provides more accurate estimates than were previously available.

Featured by the present invention is its consideration of how the stowage capacity or efficiency of a storeroom is a function not only of storeroom area but also of the storeroom's lengthwise and widthwise dimensions. Two storerooms of different geometric floor areas will tend to differ with respect to accommodativeness of stowage aids. The present invention enhances this analysis by introducing the premise that two storerooms of identical geometrical floor areas but different floor dimensions can differ with respect to accommodativeness of stowage aids. The present invention takes into account the impact, often significant, that a storeroom's length-to-width ratio can have on the number(s) and kind(s) of stowage aids that can be used in a storeroom of a given area.

The terms "compartment," "storage compartment" and "storeroom" are used interchangeably herein, each term broadly referring to any space (e.g., a room, section, compartment, chamber, etc.) that is capable of utilization for storing one or more items or kinds of items (e.g., goods, supplies, etc.). The term "stowage aid" as used herein broadly refers to any device (e.g., rack, bin, etc.) that is capable of situation in a storage compartment (i.e., storeroom) space and that is capable of effecting stowage (e.g., containment) of one or more items or kinds of items. The term "database" as used herein broadly refers to any organized body of related information. The term "floor" as used herein broadly refers to any surface upon which one or more entities (e.g., persons and/or things) may move or be situated; typically, a floor is a level surface of a room utilized for a particular purpose.

The present invention is propitiously practiced in either or both of two preferred application modes, referred to herein as "Option 1" and "Option 2." The present invention's Option 1, especially useful for assisting later stage ship designers, obtains refined estimates of the associated stowage aid amounts (e.g., volumes, weights, etc.) that would be required for existing storerooms. The present invention's Option 2, especially useful for assisting earlier stage ship designers, obtains better approximations of the storeroom sizes (e.g., internal arrangeable deck areas) that would be required to store items such as common ship stores. In a sense, the inventive Option 1 determination (i.e., of storeroom sizes) and the inventive Option 2 determination (i.e., of stowage aid amounts) represent reverse computational modes; the former determination solves for the amount(s) of stowage aids of given types(s) that can be accommodated by a storeroom of given size, whereas the latter determination solves for the size of a storeroom that can accommodate one or more stowage aids of given type(s) and amount(s). Regardless of the inventive "Option," the present invention's novel "compartment utilization factors" represent a key component of inventive practice.

The present invention is practicable in a compartment-by-compartment manner: (1) in early stage design of a ship, to estimate stowage requirements in terms of (i) ship storeroom areas and/or (ii) weights and numbers of stowage systems that will be required to store shipboard supplies and other items in prospective storerooms, taking into account their prospective sizes and geometric limitations; and, (2) in evaluation of an existing ship, to estimate stowage requirements in terms of weights and numbers of stowage systems that are required to store shipboard supplies and other items in existing ship storerooms, taking into account their existing sizes and geometric limitations.

According to Option 1, the inventive methodology determines the amounts (e.g., numbers, percentages or weights) of stowage aids that can fit inside given existing storerooms, based on the storeroom sizes (e.g., deck areas or dimensions) and types of stowage aids selected. Inventive Option 1 can be rudimentarily expressed as follows: (STOWAGE AID TYPES)+(STOREROOM SIZES)+(COMPARTMENT UTILIZATION FACTORS)→(STOWAGE AID AMOUNTS)+(VOLUME OF STORES AVAILABLE). The inventive practitioner can thus predict the weight impacts of stowage systems by determining the actual quantities of stowage aids required to store predetermined volumes of stores. Further, the inventive practitioner can specify a storeroom size (area=length×width), along with one or more stowage aid types and their corresponding quantities, to yield the total volume of stores that can be housed in such a compartment.

According to Option 2; the inventive methodology determines the storeroom sizes (e.g., deck areas or dimensions) required for given prospective stowage aids, based on the types and amounts (e.g., numbers, percentages or weights) of stowage aids selected to store the stowage items. Inventive Option 2 can be rudimentarily expressed as follows: (STOWAGE AID TYPES)+(STOWAGE AID AMOUNTS)+(COMPARTMENT UTILIZATION FACTORS)+(SHIP TYPE)→(STOREROOM SIZES). The inventive practitioner can thus predict the required arrangeable deck area by storeroom type (e.g., provision, repair part, flammable liquid storerooms, etc.), taking into account the inefficiencies of the stowage aid systems being utilized along with the human interfacing requirements (such as aisles and other access requirements). The inventive practitioner can predict default stowage volumes and default stowage aid types; by storeroom type and ship type, based upon historical naval ship practices, which the program user, can supersede, as deemed necessary.

The inventive method steps can be performed human-computationally and/or machine-computationally (e.g., using one or more computer systems such as embodied in a personal computer or computer workstation). According to many inventive embodiments, a computer system implements inventive software such as that which is set forth herein in the instant disclosure's Computer Program Listing Appendix. The computer system will typically include at least one processor, random access memory, mass data storage means (e.g., hard disk drive and/or removable storage drive), and a human-machine interface (including a display, keyboard, and a graphical pointing device like a mouse). A communications infrastructure may be available for connection with the processor(s).

The present invention's Option 1 is particularly suitable for evaluating storage as relates to an existing ship. According to typical embodiments of Option 1, an accurate estimate is obtained of required shipboard stowage for a typical ship storeroom (not driven by Ship Type). The user seeks information as to how much material can be, placed into a known shipboard storeroom, using user-targeted stowage aids. The user specifies up to four different types of common naval stowage aids, from a database of historical naval stowage aids, two commercial automated stowage systems (e.g., "KSW—Automatic Seaborne Pallet Handling System" and the "Spacesaver Corp.—Shipboard Mobile Stowage System"), or up to three user defined rack/bin stowage aids), and defines their respective percentages of use in the space. The user can then choose to "Calculate" for the answer as to how much material (e.g., in cubic feet) of stores can be stored, by defining the length and width of a single target rectangular compartment. Or, the user can "Calculate" for the answer as to how large a single storeroom has to be to contain a defined volume of stores and the width to length ratio (e.g., in a range between 0.1 to 1.0 in increments of 0.1) of the storeroom.

The present invention's Option 2 is particularly suitable for evaluating storage as relates to a newly designed ship.

According to typical embodiments of Option 2, the user specifies: the target naval ship type; the number and type of accommodations (e.g. manning Officer/CPO/Enlisted); the endurance period for provisions/stores for the target ship and any cargo it might be carrying (e.g., days of [Chill/Froze/Dry] food/accommodations/day and general stores); number/type of any embarked aircraft. The user can choose between Navy/MSC/ABS/Coast Guard classification rules for ships, and which year they were issued, to default on the historical density (weight & volume) factors for provisions. Or, the user can override the standards and specify their own provision density factors. Once these variables have been specified, Option 2 works similar to Option 1, by calculating the required area and stowage aid quantities/weights needed for stowage. However, it calculates this based on 27 different ship storeroom types. Each storeroom type defaults to a location (percentage forward/midship/aft) that historically each specific storeroom type can be found on the target ship type chosen. It is noted, however, that the user can override all program default input parameters, at multiple levels, to enter user derived input requirements.

A prototypical embodiment of a computer program product in accordance with the present invention is called "Ship Stowage Aid Analysis Program" ("SSAAP"). As discussed hereinabove, an important principle of the present invention's SSAAP is its recognition that two geometric factors—viz., (ii) the length-to-width ratio of the storeroom and (ii) the overall area of the storeroom—directly relate to the overall efficiency of the rectangular storeroom in terms of storing the maximum amount of material possible utilizing one or more given stowage aid types. For instance, a 1,000 sq-ft storeroom with a width-to-length ratio of 3/10 (narrow and long) may only be able to store half as many stowage racks as a similar area storeroom with a width-to-length ratio of 7/10. This is so because the long compartment would most likely have a single aisle way that would have racks/bins that pull out along one side of the aisle, whereas a more square storeroom compartment would be more likely to be able to have a common aisle way capable of having both sides open to racks/bins, thus simultaneously sharing their pullout space within the aisle.

The inventive SSAAP uses these geometric relationships, along with current Navy maintenance and support procedures (e.g., design data sheets, general ship specifications, etc.), to track the overall efficiencies of potential rectangular storerooms. The inventive SSAAP accomplishes this by defining a "Compartment Utilization Factor" ("CUF") for each stowage aid type, over a range of compartment areas and compartment width-to-length ratios. The CUF is defined as the net volume of a storeroom divided by the gross volume of the storeroom times one hundred (to report as a percentage). This definition assumes that the height of a compartment is limited to stowage aid restrictions or Navy-imposed human restrictions such as overhead human physical lifting limits and physical height limits of the individual stowage aids (e.g., no stowage is assumed to be situated on top of a stowage aid).

Not all storerooms describe rectangular parallelepipeds (rectangular prisms). Shipboard storerooms, for instance, often are not configured as true rectangles, but rather are affected by the horizontal or vertical sloping of the ship's shell. Nevertheless, most shipboard storerooms are outfitted with rectangular stowage aids and lend themselves to subdivision into arrangeable rectangular floor areas that include similar stowage aids. Thus, generally speaking, the aforementioned inventive principle that storeroom efficiency is a function of both the storeroom area and the storeroom width-to-length ratio is valid for rectangular as well as nonrectangular storerooms. The inventive program's use of a historical database of allowable storeroom sizes and configurations, by ship type, and forward/midship/aft location within the allowable ship types, further eliminates the inaccuracies imposed by actual ship configuration limitations.

The inventive SSAAP utilizes a combination of CUF data and historical shipboard design data to estimate the overall ship impact for predicting the storeroom requirements (e.g., area) needed during early stage (e.g., "feasibility/preliminary") ship design for ship storerooms. The CUF data, which have been empirically/experimentally derived and calculated, are stored according to inventive practice in large matrices by stowage aid type. The historical shipboard design data of existing Naval ship storerooms include information as to quantities, areas, designations, and length-to-width ratios. This information is organized in accordance with ship type (e.g., carriers, surface combatants, auxiliary ships, amphibious ships, etc.) and general shipboard locations of shipboard storerooms (e.g., taken in a ship's longitudinal direction, the forward one-third section, the middle one-third section, and the aft one-third section) of shipboard storerooms.

According to typical inventive embodiments, the inventive program utilizes a ship-type indicator (permitting selection from among, e.g., surface combatant, carrier, amphibious, auxiliary, sealift, underway replenishment, tender). Based on historical data, the inventive program calculates the storeroom area required in each one-third longitudinal section of the ship. The inventive program also suggests average storeroom sizes and compartment length-to-width ratios. Further, quantities and weights of each stowage system are added up and reported. According to some inventive embodiments, a comprehensive software scheme such as the U.S. Navy's ASSET (Advanced Surface Ship Evaluation Tool), an early stage ship synthesis design tool, can utilize the inventively determined information in its parametric redesign of the entire ship.

For these purposes, ship-related parameters are gathered (e.g., numbers of accommodations, numbers of aircraft, types of aircraft, etc.), and then the required volume(s) of stowage material needed are estimated. Then default Navy standard stowage aids for storing the material are offered in correspondence with various ship storeroom configurations. The inventive program calculates the number and type of each storeroom, the required arrangeable deck area needed, and the combined weight of the stores and stowage aids based upon the user input data. The user has the ability to override the defaults and specify up to four different types of stowage aids per storeroom type, as well as to modify the overall volume of material being stored by storeroom type (by each ship storeroom type). In this manner, a naval ship designer can accurately estimate ship volumetrics early in the ship design process.

The inventive SSAAP prototype makes use of twenty-eight traditional Naval stowage aid systems (e.g., racks or bins) and two commercial ship board stowage systems such as the "KSW—Automatic Seaborne Pallet Handling System" and the "Spacesaver Corp.—Shipboard Mobile Stowage System." Further, the user is permitted to develop his/her own stowage aids along with corresponding CUFs to evaluate alternative stowage aid features and configurations (assuming that the user stowage aid is similar in nature to a standard naval rack or bin stowage aid). At the same time, stowage requirements for twenty-eight different Navy storeroom designations (types) are assessed, based on ship type and other key naval architectural ship design parameters.

The input and output data of the inventive SSAAP are compatible with input parameters for the U.S. Navy's "Advanced Surface Ship Evaluation Tool" ("ASSET"), which does total early stage ship design synthesis analysis. ASSET is the U.S. Navy's primary early stage ship design program. ASSET was developed to help Naval architects predict and size early stage naval ship designs by means of algorithms based on physical parameters and mission profiles. ASSET is divided into modules that focus on particular aspects of ship design (e.g., structures, hull geometry, hull subdivision, machinery, weights, area/volume, etc). Further information about the U.S. Navy's ASSET (described as a "family of ship design synthesis programs") is available online at http://www.dt.navy.mil/asset/; the below-mentioned ASNE Day 2002 paper by the present inventor is also informative about ASSET.

In its ability to estimate required storage areas and storage system weights, the present invention represents an improvement to the auxiliary systems module in the latest version of ASSET. Currently being released is a version of ASSET that includes a copy of the latest version ("Version 3") of the inventive SSAAP, and is thus enhanced in the realm of prediction of shipboard storeroom area requirements and weights of associated stowage systems; the inventive SSAAP currently ships with the install disk of ASSET 5.0 and later. Version 3 of the inventive SSAAP is also available as a stand-alone computer program. Whether independent or incorporated (planned for a future release of ASSET) into the ASSET software, the inventive SSAAP can predict early stage ship storeroom area requirements and estimates of the weights and numbers of stowage systems required to store required shipboard supplies. As shipped with ASSET, the inventive SSAAP algorithms assist the early stage ship designer in developing a parametric influence on the ultimate total ship sizing requirements. As used in its stand-alone form, the inventive SSAAP algorithms permit the user to do compartment-by-compartment evaluations of existing ship storerooms, taking in their existing size and geometric limitations. Contemplated enhancements in the inventive SSAAP include those pertaining to online help and printed reports. In addition, pictures of the target stowage aids can be incorporated in the inventive program. It is contemplated that a future release of the inventive SSAAP program will be more tightly associated with the ASSET model, such that some kinds of data sharing between the two programs can be accomplished with reduced or minimal user involvement, or such that the program logic of SSAAP can be embedded into the Auxiliary Systems module of ASSET.

As to SSAAP Versions 1, 2 and 3, certain procedures can be followed to lead to more accurate area and weights estimate of storerooms and associated stowage aids. Neither Version 1 nor Version 2 nor Version 3 of the inventive SSAAP directly transfers data to or from ASSET. It is up to the user to run the SSAAP program with matching data regarding the ASSET ship being investigated. Output of the inventive SSAAP can be inserted into the ASSET model through the use of ASSET's "payload and adjustments." For instance, the user should negate the storeroom area estimates for each of the twenty-eight different storerooms types (SSCS groupings) by selecting an area factor of "–1" for each of the twenty-eight storeroom types. The user should enter the new SSCS-related SSAAP area estimate for each of these storeroom types, using the "area add" input field associated with each ASSET "SSCS area payload and adjustment." Moreover, the current ASSET does not estimate the weights of the stowage aids, and a similar ASSET "payload and adjustment" for SWBS Group 672 should be added to account for the sum total of all the stowage aid weights. Furthermore, loads should be checked (SWBS "F" groups) for differences between the inventive SSAAP program and the ASSET program. In many such cases the user should use a similar procedure by choosing a factor of "–1" for the ASSET "SWBS load group" and by entering new values using the "weight addition field" of the ASSET's "payloads and additions." The user may be required to sum the F Loads by hand while reviewing them within the inventive SSAAP output screen.

According to typical embodiments of an inventive method or computer program product for estimating ship stowage requirements, initialization data is stored pertaining to criteria including stowage aid types, storeroom types, ship types, stowage requirements in accordance with ship types, space layout rules (regarding usable storeroom space), and "Compartment Utilization Factors" (each "CUF" data matrix corresponding to a particular stowage aid). The user defines a target storeroom width-to-length ratio and a target volume of stowage, and selects a number of stowage aids. A set of data is read relating to a predetermined group of stowage aids. Based on the application of space layout rules and the selection of CUFs corresponding to the selected stowage aids, the required gross deck area required to store the volume of stores is found. From this, the number of storerooms needed to hold the volume of stowage is determined. The results are stored and displayed to the user.

According to many inventive embodiments the present invention, using other Navy documentation, estimates the initial quantity (volume and weight) of storage material to be stored in each compartment. By initially following general specifications of the U.S. Navy for surface ships, the present invention defaults to prescribed stowage aids types and their percentage usage, by compartment type, for each of the various ship storeroom types that the inventive program addresses. The volumes of the stores by percentage for each stowage aid type are noted (e.g., entered in an inventive program), and the number of each storage aid type that is required to store the given volume of supplies is determined. Each compartment type has associated therewith a pre-established number of storage aid types. Knowing the number of storage aids by type and the ship-type historical information for each storeroom, the stowage aid volume is converted into an area estimate. Then, the numbers of equivalent ship storerooms of historical size and shape (by longitudinal location) are evaluated by taking each stowage aid estimated gross stowage aid area and further dividing it up to account for the amount found in the Fwd/Mid/Aft sections of the ship, then dividing each one-third section by the historical storeroom area size found in the selected ship type. The resulting areas are then adjusted, as to each stowage aid chosen, by an associated "Compartment Utilization Factor" ("CUF"), which increases the storeroom size to account for practicalities such as access and pull-out requirements for each stowage aid chosen. Any remaining area (equal to less than a single standard historical storeroom area) is treated in a manner not unlike FOSSAC's prescribed design technique, whereby such area portion is simply doubled.

The present invention not only estimates areas while taking into account the stowage aids' access and pullout requirements, but also anticipates the additional area losses due to multiple storerooms, each with doorways and compartment stiffening requirements. For refrigerated storerooms, the program accounts for the storeroom bulkhead insulation and air circulation separation requirements. The sum is taken of the final storeroom areas, and the total number of stowage aids (and their weights) needed to store the required supplies is determined. Generally, storage requirements estimates found according to the inventive methodology exceed those found according to FOSSAC's doubling approach, and are significantly more reliable. An exception to the usual superiority of the inventive methodology is in the realm of bulk stowage systems, which tend to a have a CUF factor in the approximate range between 60% and 68%. Inventive practitioners have the prerogative of independently validating storeroom CUFs through experimentation similar to that performed by the inventor, entailing the laying out of general arrangements for storeroom types pursuant to guidance such as provided by DDS-671. The inventive methodology presupposes rectangular compartment configurations, and does not account for the use of hull outboard flair in which to store additional stowage aids.

Incorporated herein by reference is the following paper, informative as to various aspects of this invention, presented by the inventor at a conference of the American Society of Naval Engineers (ASNE): James David McWhite, "Early Stage Surface Ship Design—Shipboard Stowage System Requirement Estimation Program," ASNE Day 2002, 29-30 Apr. 2002, Arlington, Va.

Other objects, advantages and features of the present invention will become apparent from the following detailed description of the invention when considered in conjunction with the accompanying drawings.

BRIEF DESCRIPTION OF THE DRAWINGS

FIG. 2A through FIG. 2E together constitute a flow diagram illustrating a typical embodiment of the present invention's methodology in accordance with Option 2, especially suitable for estimating required shipboard stowage on a new ship (i.e., a ship that is in the process of being designed but is not yet built).

FIG. 3 is a tabular representation of the twenty-seven storeroom categories established by the U.S. Navy and adopted by a typical embodiment of a computer program product in accordance with the present invention. Titles of these ship board storerooms are in accordance with the Navy's "Ship Space Classification System (SSCS)." Similar SSCS area requirements are used to track arrangeable ship deck area by ASSET, as well as SSAAP.

FIG. 4 is a tabular representation of the thirty-five stowage aid categories adopted by a typical embodiment of a computer program product in accordance with the present invention, at release of SSAAP (Rev. 3).

FIG. 6 is a tabular representation of some definitions pertinent to typical inventive Practice.

FIG. 7 represents an example according to the "KSW—Automatic Seaborne Pallet Handling System. " FIG. 8 represents an example according to the "Spacesaver Corp. Shipboard Mobile Stowage System."

DETAILED DESCRIPTION OF THE INVENTION

Referring now to the figures, the present invention's unique concept of "Compartment Utilization Factor (CUF)" is central to inventive practice. A CUF is a design parameter that can be used in estimating how efficient a storeroom (e.g., shipboard storeroom) could be in storing a given volume of material using one type of stowage aid. For each type of stowage aid, the CUFs are associated with the gross volume of a storeroom, assuming a rectangular configuration. The CUFs are a function of the width-to-length ratio (W/L), and are stored as a data matrix for use in refining the rough estimates into useful results. The CUFs are determined using a series of constant storeroom gross areas having different compartment width-to-length (W/L) ratios.

Typically, CUFs are used to determine the maximum number of stowage aids that can be functionally placed in a given storeroom, taking into account several rules or guiding principles including the following: (i) stowage aids may not be placed within six inches of two of the compartment's adjacent bulkheads, to allow for bulkhead stiffener clearance; (ii) a 3-foot by 3-foot entrance way is reserved, located in the compartment corner opposite the two bulkheads representing the six inch clearance; (iii) all aisle ways are assumed to be intersecting and have access to the compartment's entrance; (iv) aisle widths shall not be less than 2 feet, 6 inches wide, or the stowage aid's maximum required pull-out clearance (e.g. drawer opening depth or shelf stowage depth), whichever is greater; (v) special design restrictions can be established for certain storerooms, e.g., refrigeration compartments, such as involving bulkhead insulation or air circulation restrictions (typically, for bulkhead insulation and air circulation, a 6-inch clearance from all bulkheads is established for stowage aids to be utilized in refrigerated compartments; (vi) aisle arrangements are to comply with specified regulations, and do allow for bulk stowage deck grating systems; (vii) stowage is not permitted in the aisles or on top of stowage aids; (viii) generally, the more sophisticated the stowage aid, the more limits to arrangement thereof will be imposed on the layout of a storage compartment.

Figure 5:
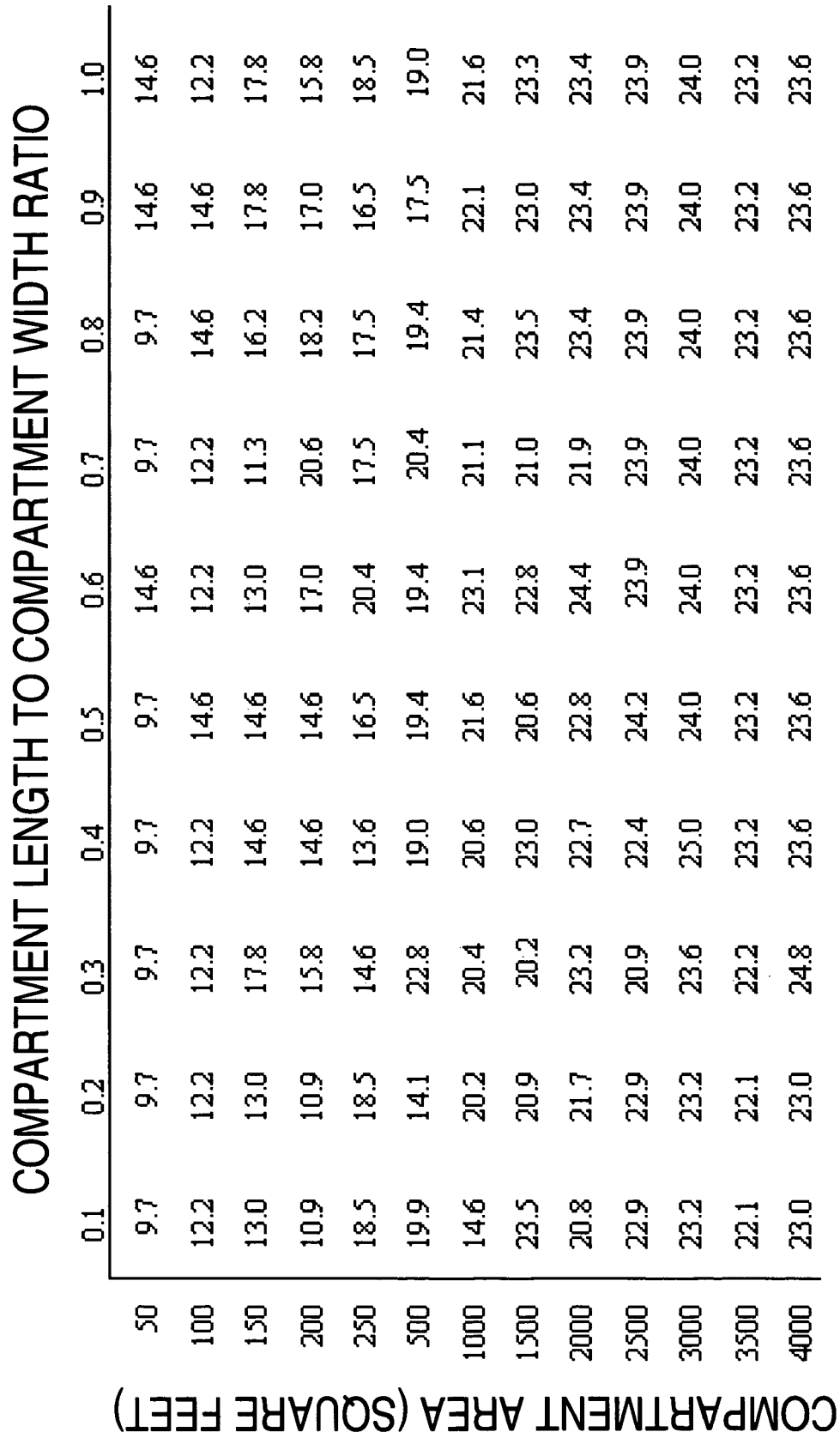
FIG. 5 is an example of an inventive data matrix describing variation, within a broad range of storeroom areas, of the compartment utilization factor (CUF) in accordance with the paired correspondence of the storeroom area with the storeroom's width-to-length (W/L) ratio. The compartment utilization factor is indicative of the number of stowage aids that can be fit into the storeroom. The matrix shown in FIG. 5 pertains to historical Naval "K-Rack" compartment utilization factors.

Within a given CUF data matrix, an example of which is shown in FIG. 5, the layouts are repeated over a wide range of storeroom areas (typically from 50 square feet to 4,000 square feet in 50 or 100 square foot intervals). Each CUF is calculated as a percentage representing the maximum net stowage volume. The maximum net stowage volume is the value of the number of stowage aids able to be stored, multiplied by the net volume available for stowage in each stowage aid, divided by the gross compartment volume. The gross "required" deck area of a storeroom is the sum of the foot print area of each stowage aid, used within the storeroom, divided by the compartment's CUF. The gross compartment volume is the total storeroom's gross area multiplied by the stowage aid's height, or by 6 feet for dry bulk stowage, or by 6½ feet for frozen or chill bulk stowage (plus the height of the bulk stowage system floor grid system).

Reference is now made to FIG. 1A through FIG. 1E (aggregately representative of Option 1, especially appropriate for an existing ship design) and FIG. 2A through FIG. 2E (aggregately representative of Option 2, especially appropriate for a ship in the design stages). These two flow charts are illustrative of the two respective modes of a prototypical "Ship Stowage Aid Analysis Program" ("SSAAP") in accordance with the present invention.

Typical inventive algorithms can be described in basic terms as performing steps, in various sequences, including some, for Option 1, or all of the following for Option 2 of SSAAP:

(1) Based on historical U.S. Navy supply stowage requirements and/or user-defined input requirements, the total volume of stowage items requiring storage is estimated, for each storeroom type.

(2) Dividing the volume found in step (1) by the percentage of each stowage aid being specified for the target storeroom type, the total volume for each stowage aid type is determined.

(3) The total volume of stowage items, for each stowage aid specified, found in step (2) is divided by the net volume of the stowage aid of interest, thereby obtaining an initial estimate of the total number of stowage aids required, for each stowage aid type.

(4) The results of step (3) are multiplied by the gross foot print "floor" area of the associated stowage aid to estimate the initial required deck area required for each stowage aid type specified.

(5) Summing the results of step (4) for each of the stowage aids utilized within the storeroom type in question, an initial estimate is made of the total storeroom area required to store the total volume of stowage items found in step (1).

(6) Based on the selected ship type, historical ship data is retrieved from a data matrix, according to the storeroom type(s) (SSCS groups) and their specified longitudinal location percentages (%-fwd/%-mid/%-afl), regarding the average historical storeroom area and its matching compartment W/L ratio.

(7) The specified storeroom, longitudinal location percentages are used in combination with, the average storeroom area and W/L ratio (by type), identified in step (6), to estimate the initial CUF for longitudinal length zone (i.e., fwd/mid/aft), for each stowage aid type utilized.

(8) Multiplying the areas calculated in step (4) for each stowage aid type, by the longitudinal location percentage specified for each storeroom type, the amount of area is determined for each aid type located in the forward/amidships/aft thirds of the ship.

(9) Dividing the longitudinal zoned are from step (8) by their associated Storeroom CUFs from step (7), the required area (by longitudinal length zone) is yielded for each stowage aid.

(10) Summing the items in step (9), a refined estimate is provided of the total storeroom area needed, by storeroom type. However, this estimate is premised on the definition of a CUF having only one storeroom entrance area (3 feet by 3 feet). Further, there may be many such storerooms on the subject ship, based upon historical observations.

(11) By summing the areas of step (9) for each longitudinal length zone (i.e. Fwd/Mid/Aft), an initial estimate is obtained of the area needed in each third of the ship's length, for each storeroom type.

(12) Dividing the zonal area identified in step (11) by the historical storeroom area identified in step (6), the total number of storerooms, of each storeroom type, by longitudinal location, is developed.

(13) Logic is used to check if the area required in each of the longitudinal zones is sufficient to contain at least one of the standard storerooms identified in step (6), where the user-defined percentage is greater than zero. Should insufficient area be found to support a standard historical average storeroom area, by zone, the zone is then assumed to contain no storerooms of the specified type. The associated area is added to the next adjacent storeroom zone, and the process of comparison is repeated, until all three longitudinal zones have been reviewed for compliance. At least one storeroom of each type, identified as containing some stowage, is assumed located at the longitudinal location that contains the highest percentage of longitudinal location (defaults to amidships if not distinguishable), unless there should be less area specified in step (5) than is present in a single historical storeroom area identified by step (6). At a minimum, there exists one storeroom type of size equal to the summed area of step (5) divided by the historical matching CUF for the longitudinal location that best estimates the storeroom location, as identified above.

(14) The total number of storerooms found in step 12 and refined in step 13, minus 1, is then multiplied times 9 sq-ft (to account for the 3 foot by 3 foot entranceway used to develop the definition of storeroom stowage aid CUFs). The result is then added to the initial storeroom area estimate found in step thereby obtaining the "gross arrangeable deck area required," viz., a final estimate of the total storeroom area required to store the total volume of stowage items found in step (1).

As actually embodied in the prototypical computer program product, the present invention performs the steps described in the preceding paragraph in a much more refined manner than as stated in the preceding paragraph. For instance, the inventive program prototype takes into account remaining area left over as a fraction of a compartment. In ASSET, the VCG and LCG estimates and their effects on the weight moments are involved, as well as other stowage aid system effects such as those one might expect to see in the comparatively complex KSW or SPACESAVER stowage systems.

Figure 1A:
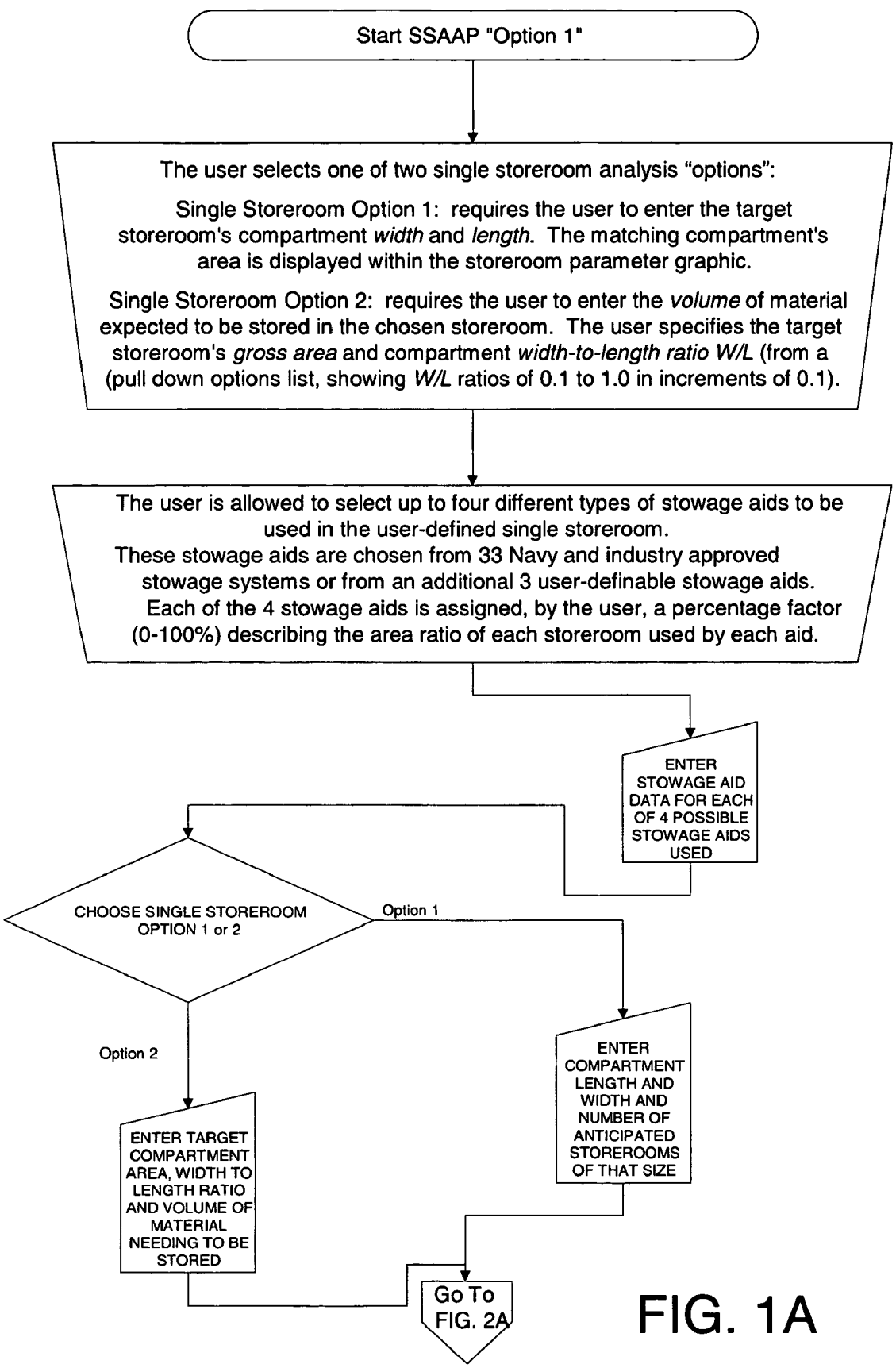
FIG. 1A through FIG. 1E together constitute a flow diagram illustrating a typical embodiment of the present invention's methodology in accordance with Option 1, especially suitable for estimating required shipboard stowage on an existing ship (i.e., a ship that has been previously designed, or previously designed and built).
Figure 1B:
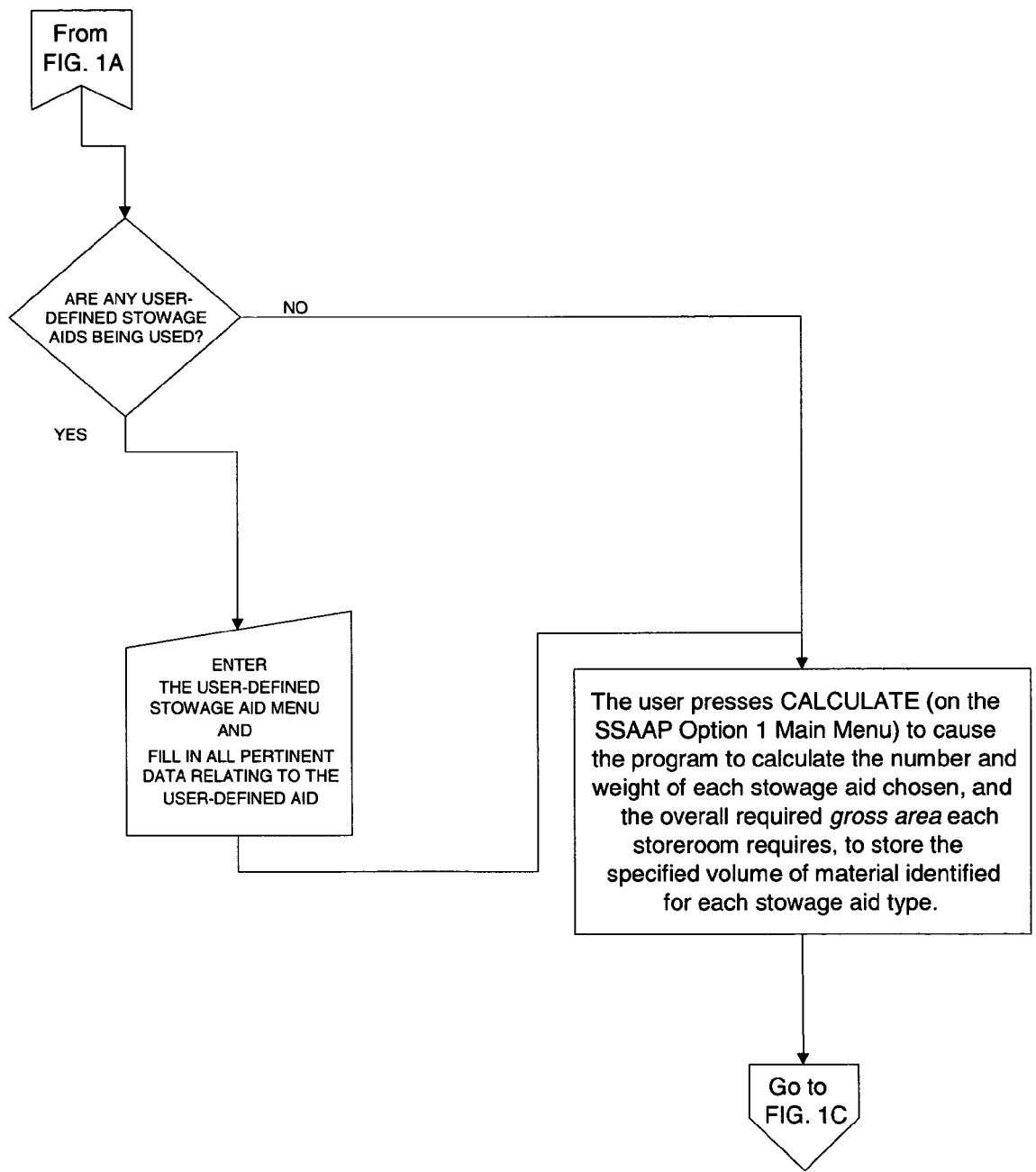
Figure 2A:
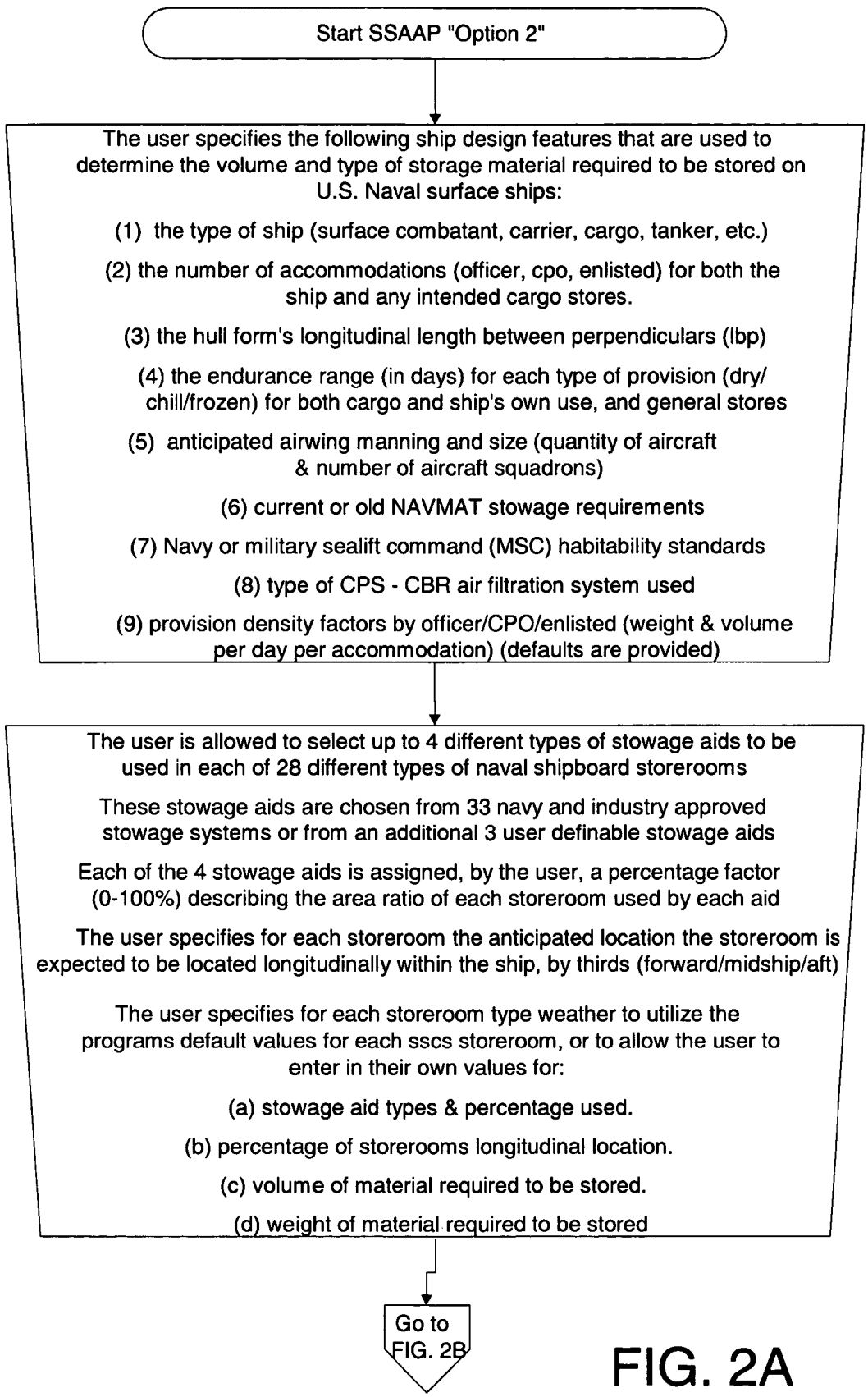
Figure 2B:
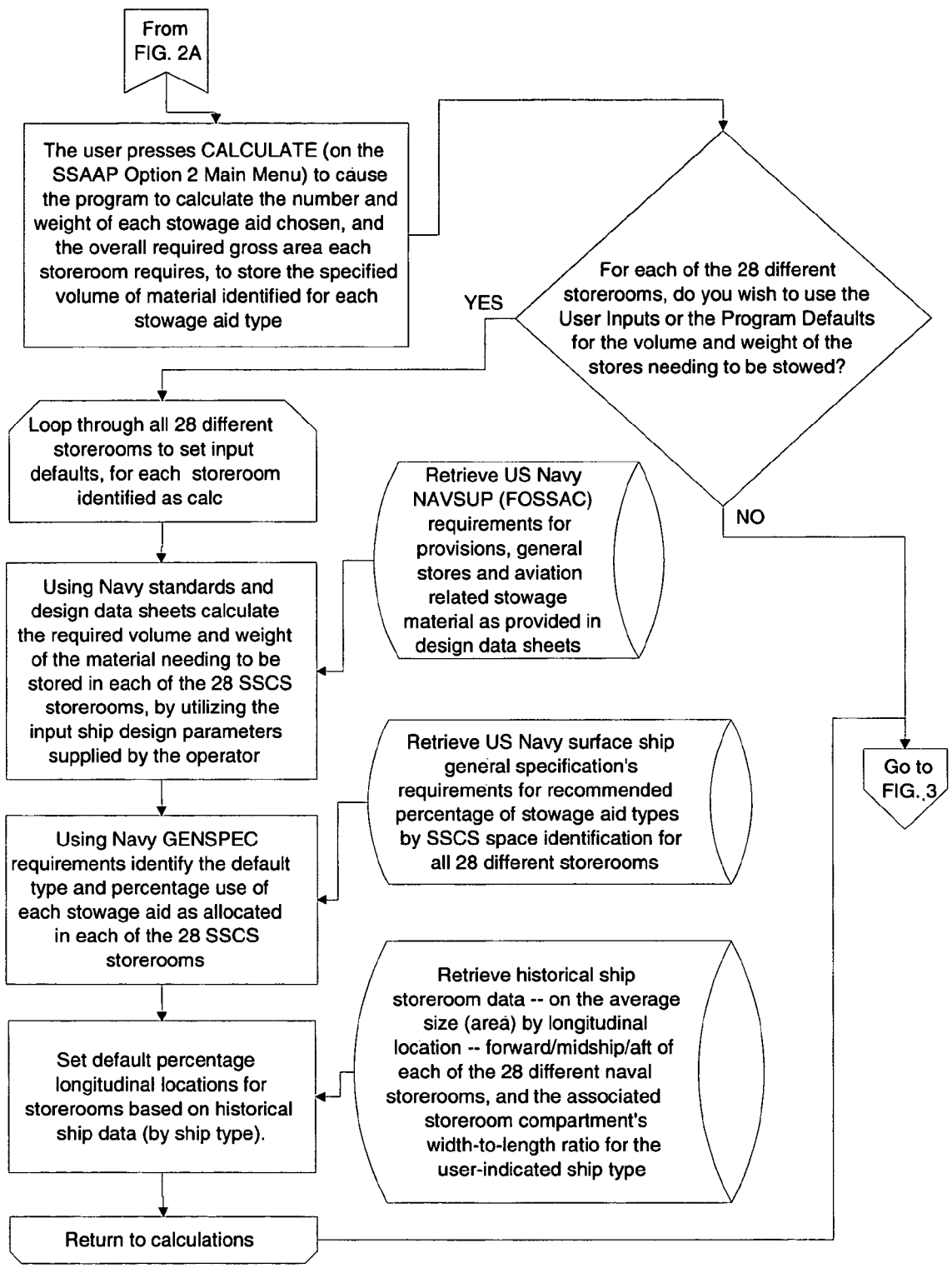

As shown in FIG. 1B and FIG. 2B, according to either Option 1 and Option 2 there exists in the inventive program prototype a user kick-off option (to help the user get started), a so-called "CALC" (calculation) mode that pulls related data either automatically or from user-inputs. Examples of ship design parameters considered are ship's length, number of accommodations, endurance requirements, number of aircraft (by type) onboard, etc. These data are then related to known supply requirements to gain an initial guess as to the amount (e.g., volume and weight) of the items that are needed to be stored. As distinguished from the "GIVEN" mode, the CALC mode estimates the required stowage materials (by all twenty-seven storerooms) as well as the recommended (GENSPEC) stowage aids that should be utilized.

The CALC mode also makes use of the ship type indicator variable and significant historical ship storeroom data to propagate a matrix of required input. During this event the inventive algorithms adjust for other ASSET design parameters (e.g., accommodations, number of aircraft, endurance requirements, cargo requirements, etc.) to come up with the required amount(s) (volume and weight) of items that need to be stored while at sea. Many of these algorithms are based upon NAVSUP, NAVAIR and FOSAC Navy requirements. At the conclusion of this process the user has the ability to switch back to "GIVEN" mode and re-adjust the input volumes and weights, or re-mix or use new stowage aids, and adjust the LCG of each storeroom. The weights of the storage items are automatically added to the loads (SWBS F-Groups) required in the total ship design.

In some cases the storage requirements of a particular storeroom, especially in early stages of a ship design, will not be known. But historical knowledge may dictate that there exists some stowage onboard to accommodate for those items. The present invention considers existing ship class designs and assumes the same required area that was needed in the most recent ship type currently deployed (e.g., carrier, amphibious, surface combatant, auxiliary, sealift, unrep or tender) as a default, when a more physics-based approach is not available from deduction of optional input parameters (e.g. number of accommodations, days of provisions, etc.). This historical data is stored so that these spaces can have the required areas (and load weights) for those storerooms filled in with estimates.

It is recommended that the user first fill in the data on the displayed form prior to pressing the "CALC" button to solve for solutions. The user is advised run the program first in the "CALC" mode as to all twenty-seven SSCS storerooms in the "CALC" mode, filling in the output fields for each storeroom. The user may wish to enter his/her own values for stowage volume and weight, or may wish to choose a different combination of storeroom stowage aids, or their approximate locations within the target ship type (using a percentage of longitudinal distribution by one-third ship lengths, i.e., FWD/MID)/AFT). This is performed by pulling down the SSCS storeroom designation field and selecting the appropriate SSCS storeroom, then altering any of the other user definable fields (within the upper input area of the form). The user switches the SSCS calculation mode value from "CALC" to "GIVEN" for each SSCS storeroom that he/she alters. At this point, the user is ready to re-calculate for new answers.

Both Option 1 and Option 2 have a user-defined stowage aid parameter button that takes the user to a new form that allows the user to develop his/her own stowage aid (e.g., an equivalent rack or bin) for analysis. This data is kept in memory as long as the inventive program remains on, accessible in both Option 1 and Option 2 (even switching there between) without data loss. In contrast, the related ship parameter data field values are lost when switching from Option 1 to Option 2 (for Option 1 does not require any ship related parameters). With the current release of "Version 2 and beyond" of the present invention's SSAAP, users can now store user-defined data along with other ship and stowage aid selections to a file for later recovery, thus saving time when evaluating different ship storeroom configurations; however, only Option 2 user inputs are stored in this manner, whereas Option 1 user inputs are reset to starting defaults each time the form is started.

When the inventive program is run under the "CALC" mode of Option 2, the default settings are established based on a host of historical data, NAVSUP and FOS SAC design requirements, and NAVAIR aircraft supply information. Version 3 of the inventive SSAAP permits the user to enter his/her own space and weight factors for dry, chill and frozen provisions, thereby overriding the SSAAP defaults. This feature has been added in the inventive program's Version 3 due to the changing environment in Naval ship design in the realm NAVSUP food services. Many ship designs (e.g., the DD(X) and the CVN(X)) are developing new provision factors that have not yet been officially recommended by NAVSUP.

Inventive Options 1 and 2 use similar approaches to determining storeroom sizes and quantities. In Option 1, however, the user has more control over the actual storeroom size. In Option 2 the inventive program defaults to historical storeroom sizes based on ship type and what longitudinal section of the ship (FWD/MID/AFT) the storerooms historically have been located in. New to Version 3 of the inventive SSAAP is a detailed printed report of the Option 2 storerooms that provides the numbers and sizes of principal and secondary storerooms in each one-third longitudinal section of the ship. "Principal" storerooms are the number of storerooms of historical value found. "Secondary" storerooms are the residual space needed to store the remaining material.

Version 3 of the inventive SSAAP begins by computing, as to each selected stowage aid, how many stowage aids are required to store the user-defined percentage of the stores. SSAAP then ascertains the basic total stowage aid footprint area and uses it to determine a starting area assumption. This assumed area is divided by the historical storeroom area to determine the number of primary storerooms existing in each one-third section of the ship according to SSCS. Any fractional part is placed in a smaller (secondary) storeroom, and SSAAP uses the same CUF-area-length-to-width ratio database as it uses for a primary storeroom in order to select the CUFs corresponding to this secondary storeroom. The sizes, CUFs and locations of all primary and secondary storerooms by SSCS storeroom type are listed in the storeroom detail printed reports.

Option 1 (shown in FIG. 1A through FIG. 1E) typically provides for several data tables that are either set up with standard elements or are receptive to user input. In a preferred embodiment, data for various items such as stowage aids, ship types and compartment utilization factors are stored for use, though user inputs may also be received.

Referring to FIG. 1A, for existing ships the user may either enter the target compartment width and length and the number of these storerooms anticipated, or may enter a target compartment length-to-width ratio and an estimated volume of stores. The user may designate up to four different types of stowage aids to be used in a single storeroom. These stowage aids may be selected from a stored data library, or the user may specify the pertinent data relating to a user-defined stowage aid. Additionally, the user must specify the percentage factor describing the area ratio of the storeroom to be used by each stowage aid.

Figure 1C:
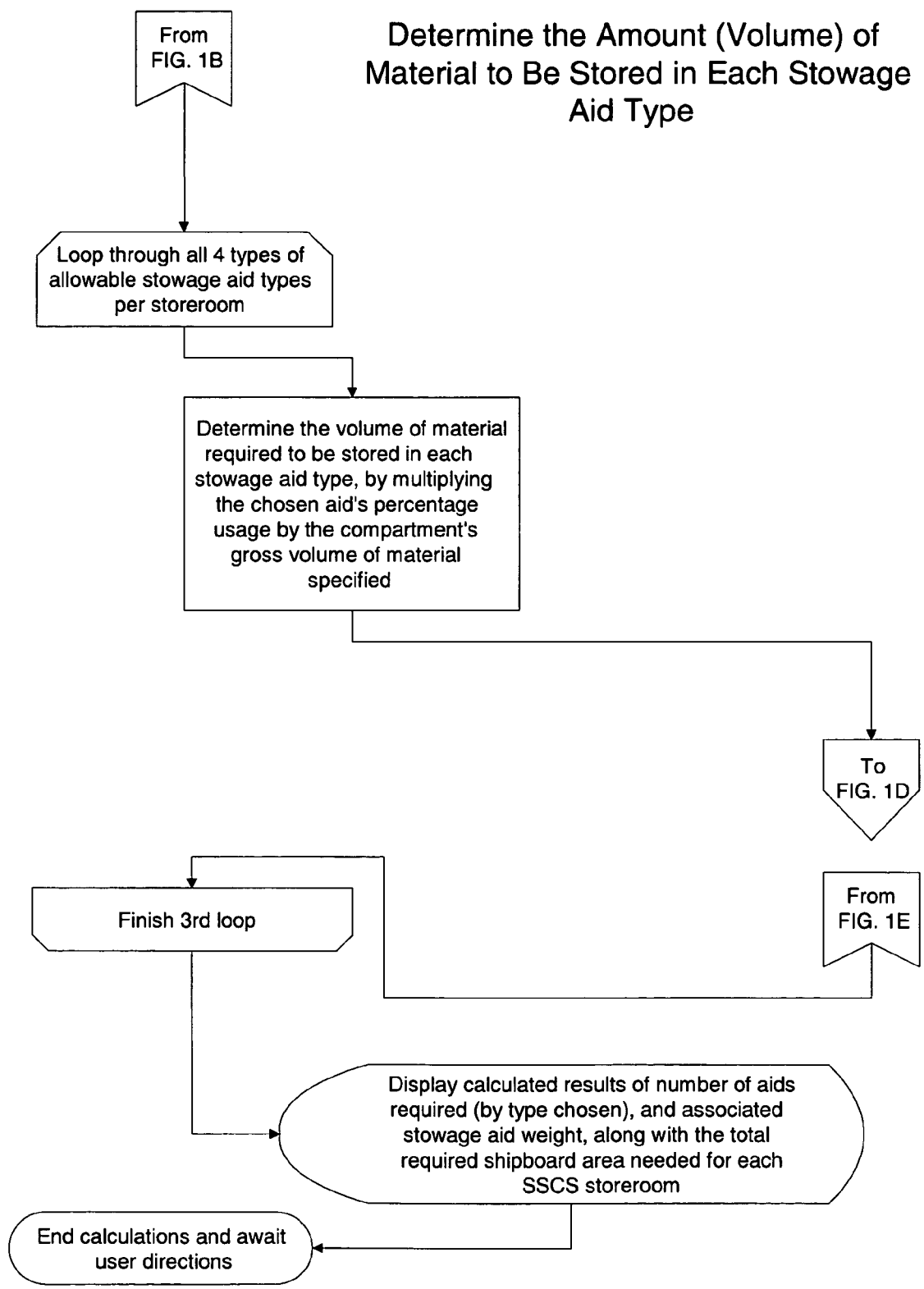
Figure 1D:
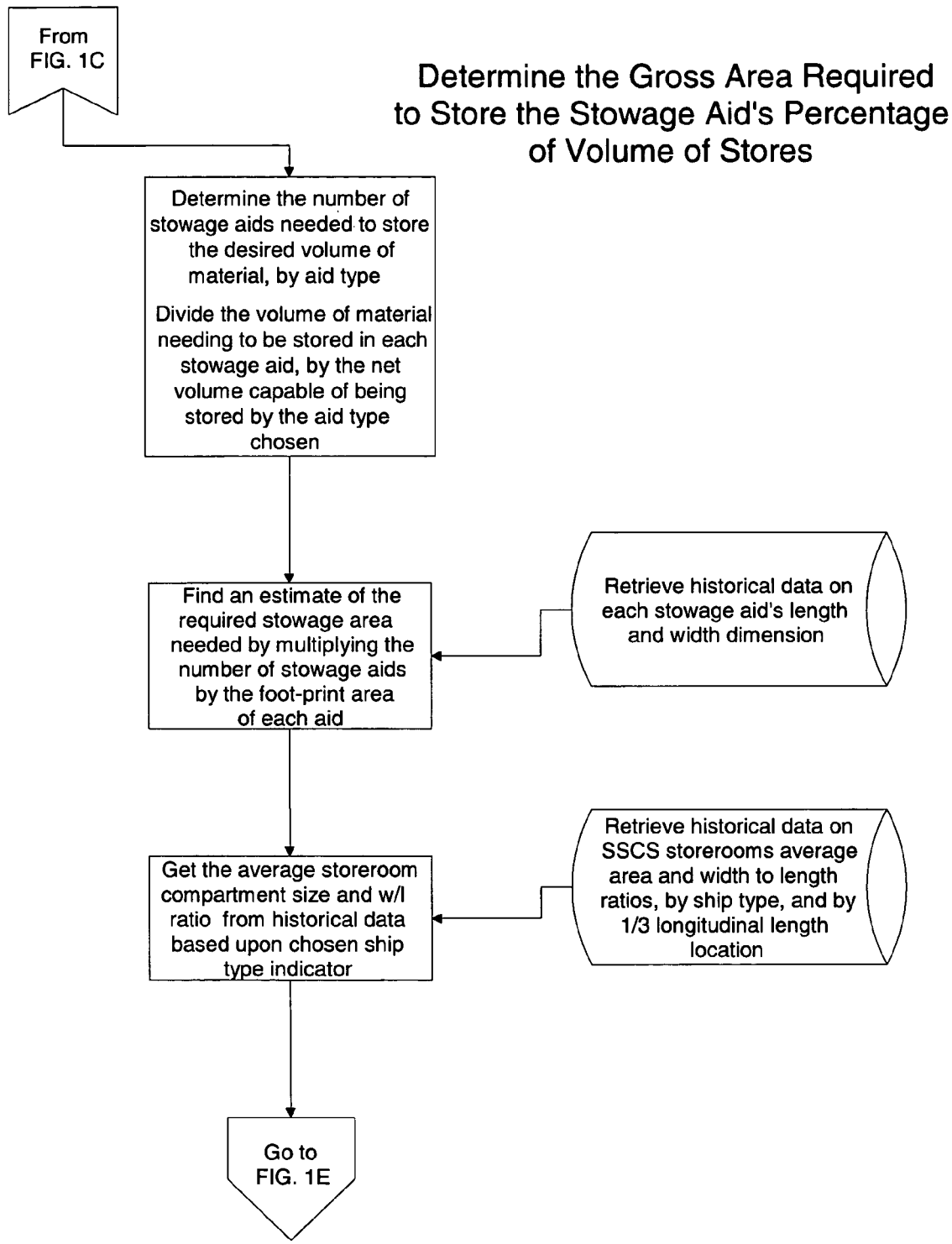

With reference to FIG. 1C, the data relating to each stowage aid selected is applied, and the volume of material to be stored in each type of stowage aid selected is calculated. The results from this calculation are then used to determine the number of stowage aids of each type needed to store the volume of material. As shown in FIG. 1D, based on the stored data regarding types of stowage aids, an initial estimate of total stowage area is calculated.

Figure 1E:
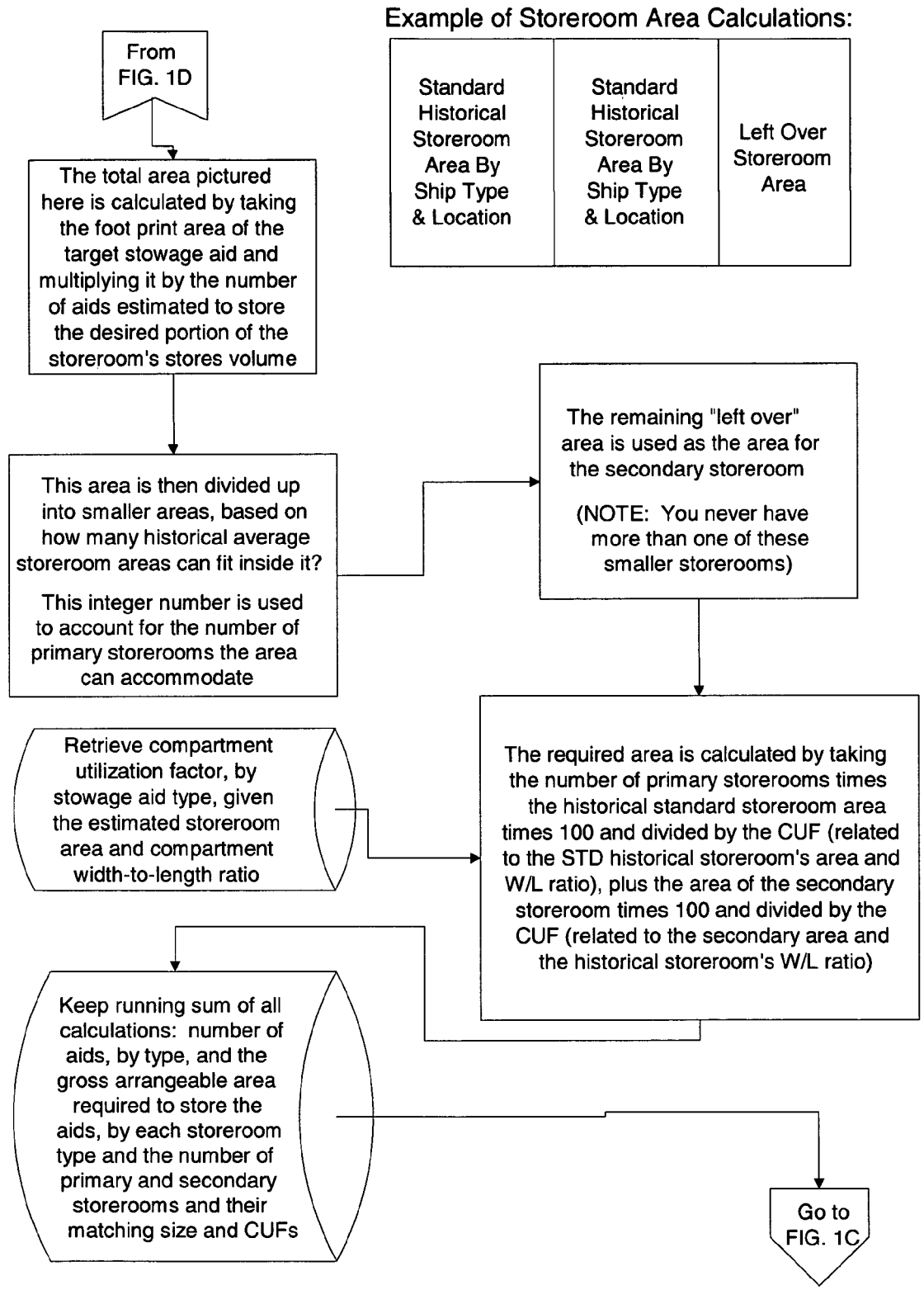

As shown in FIG. 1E, the historical data stored relating to average storeroom sizes based on ship type, and organized according to three one-third longitudinal sub-lengths, is used to calculate the total storeroom area estimate. This total area estimate is broken down into smaller areas to indicate the number of historical storerooms and any extra space that will be required to store the volume of material. The extra space is used to indicate a subsidiary or secondary storeroom that will be required to store all the materials.

Still referring to FIG. 1E, this rough estimate is further refined and adjusted by applying the CUFs to the historical storerooms and the secondary storerooms. This will increase the storeroom size to account for access, pull-out clearances and other factors. As shown in FIG. 1C, after running the process for each stowage aid type, the numbers (and the associated weights) of the stowage aids are displayed to the user. The user may then choose to go back and change data to see how different stowage aid combinations may impact the stores.

Option 2 is similar to Option 1, except that Option 2 is more aptly implemented for new ship designs to assist the designer in estimating stowage space and weight impacts. After the user selects Option 2, the user must define a set of initialization data to be used. As shown in FIG. 2A, the user specifies an initialization data set of ship design features that may be stored in data libraries or entered by the user. Data libraries may be stored in separate files, for later recall.

Referring to FIG. 2B, if the user chooses to use defined rules and historical data, the inventive program will estimate the volumes and weights of stores needed in each of the defined ship storerooms. An inventive SSAAP prototype permits the user to select from among twenty-eight different standard storeroom types according to the U.S. Navy's "Ship Space Classification System" ("SSCS"). A user is provided with alternatives to merely availing himself/herself of the twenty-eight standard storeroom designations. For instance, a user may wish to do one or more of the following: enter his/her own values for stowage volume and weight; or, choose a different combination of storeroom stowage aids; or, choose the approximate locations (e.g., using a percentage of longitudinal distribution by ⅓ ship lengths, i.e., "forward/midship/aft") of storeroom stowage aids within the target ship type.

Still referring to FIG. 2B, using other Navy historical documents an initial estimate is made of the initial quantity (volume and weight) of storage material to be stored in each compartment. Then, by initially following predefined rule (e.g., the General Specifications of the United States Navy for Surface Ships), the inventive program defaults to prescribed stowage aid types and their percentage usage, by compartment type, for each of the twenty-eight different ship storerooms the inventive program has stored in a data library. In the light of this disclosure, the ordinarily skilled artisan will appreciate how inventive practice permits definition of many different kinds of storerooms and stowage aids, including and beyond default information provided in these respects.

Figure 2C:
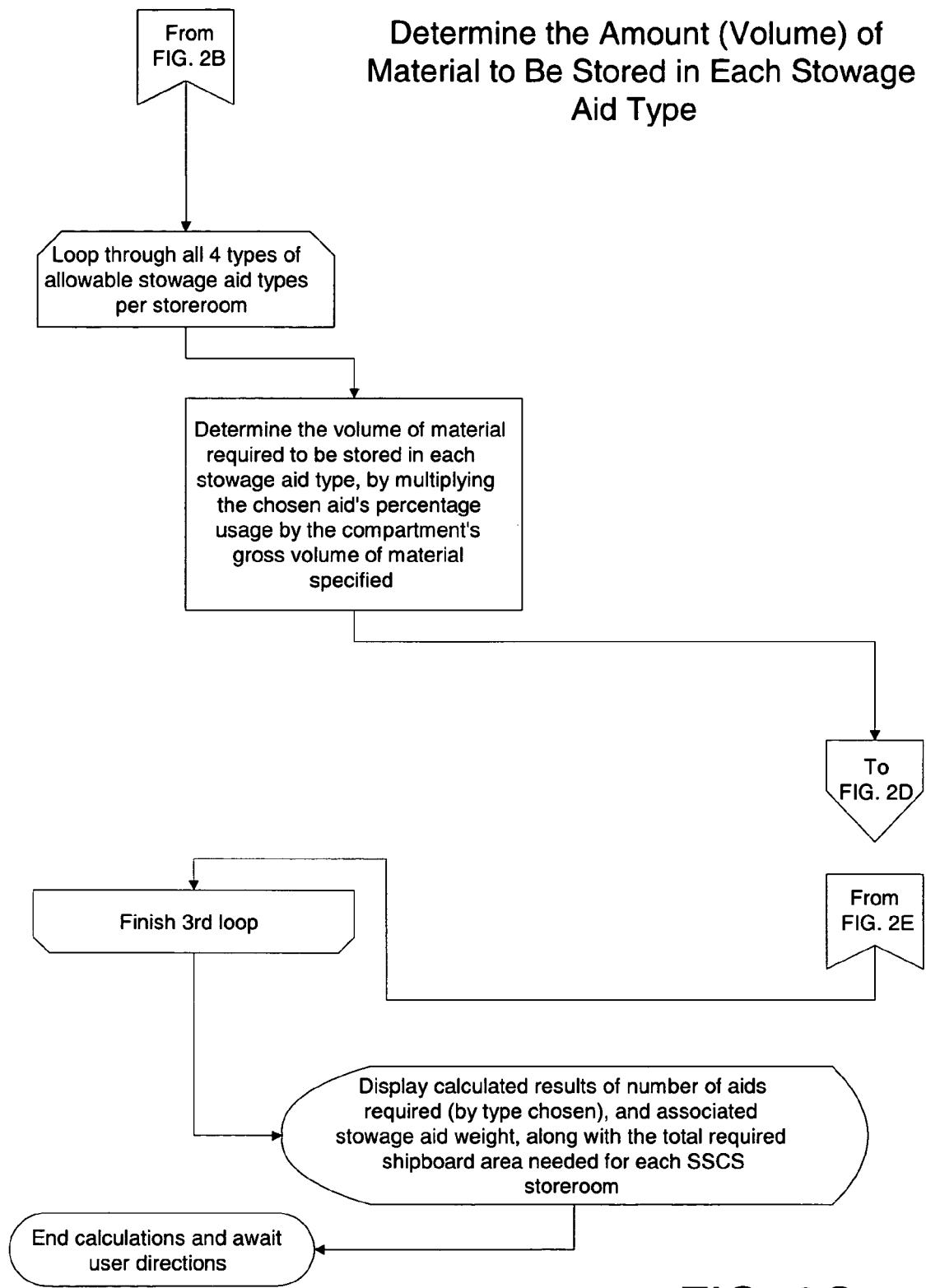

As shown in FIG. 2C, the inventive program divides the volumes of stores according to percentages corresponding to each stowage aid (up to four stowage aid types per storage compartment type). The number of each stowage aid that is required to store the given volume of stores (e.g., supplies) is calculated as shown in FIG. 2D. Based on the numbers of stowage aids (by type) and the ship type historical information for each storeroom, an estimated stowage area is calculated.

Figure 2E:
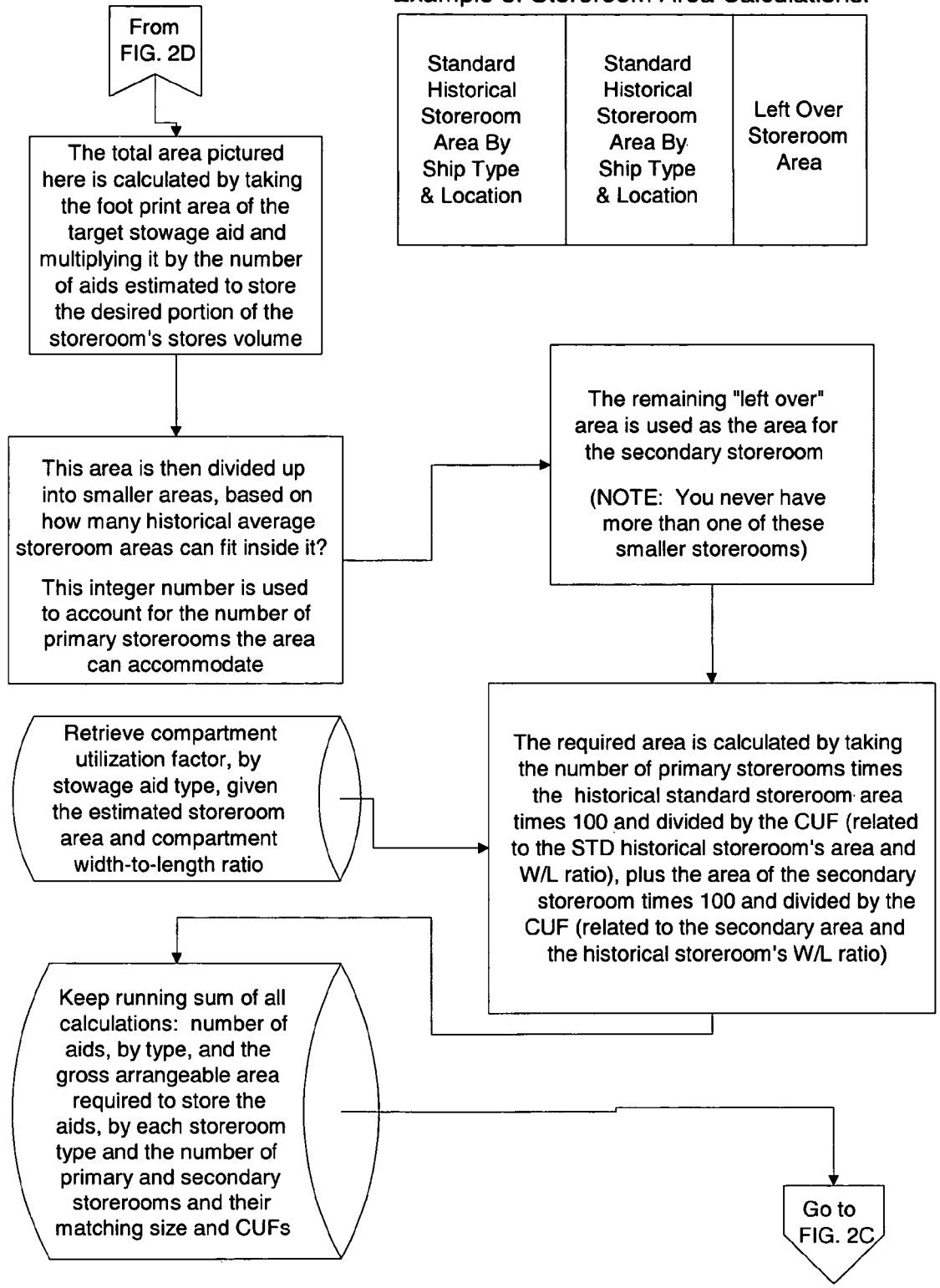

With reference to FIG. 2E, the stowage aid volume is converted into an area estimate. The inventive program then determines how many equivalent ship storerooms of historical size and shape (by longitudinal location) are required to meet this area requirement. This is performed by taking each stowage aid type's estimated gross stowage aid area and further dividing it up to account for the amounts found in the forward/midship/aft sections of the ship. Then, each section is divided by the historical storeroom area size found in the selected ship type.

Still referring to FIG. 2E, the resulting areas are then adjusted by an associated CUF, which increases the storeroom size to account for access and pull-out requirements, etc., for each stowage aid chosen. Any remaining storeroom portion (e.g., an area equal to less than the area of a single standard historical storeroom) is merely doubled, thus treated in a manner similar to the conventional "doubling" design estimation methodology. By combining CUF information with other information, the area estimated for a storeroom not only takes into account the access and pull-out requirements for the stowage aid(s), but also anticipates the additional area loss due to multiple storerooms, each with doorways and compartment stiffening requirements. Reported back to the user are the sum of the final areas (one area for each compartment), along with the total number of stowage aids (and their weights) needed to store the required stores (e.g., supplies).

Reference now being made to FIG. 3, the prototypical inventive program avails itself of twenty-seven standard storerooms as designated by the U.S Navy. These standard storerooms have their required areas tracked based on the Navy's "Ship Space Classification System" ("SSCS"), as defined in MIL-STD-2150A. FIG. 3 lists the storeroom's SSCS designation, a brief description of the storeroom's purpose and the "Ship Work Breakdown Structure" ("SWBS") weight-tracking group with which the "stores" themselves are associated. The Ship Space Classification System (SSCS) and the Ship Work Breakdown Structure (SWBS) are utilized to track the area and weight requirements for the ship design.

There are twenty-seven different types of shipboard storerooms being analyzed within the prototypical inventive algorithms. Each storeroom space (e.g., supply department storeroom, aviation repair parts, dry provisions, etc.) permits the user to supply the quantity of storage items (e.g., by volume and weight), along with the type or types of stowage aids to be used (up to four different stowage aids per storeroom), along with the appropriate percentage of each stowage aid (e.g., 30% B-BIN and 70% Dry BULK). The user also provides the likely percentage location of these storerooms longitudinally by selecting what percentage lies in the forward, mid or aft third of the ship (e.g., 35% Fwd, 0% Mid, 65% Aft), based upon ship type selected.

With reference to FIG. 4, both the Option 1 algorithmic software and the Option 2 algorithmic software offer the user up to four different types of stowage aids, which can be concurrently utilized in any generic storeroom (Option 1), or in one of the twenty-seven different Ship Space Classification System (SSCS) storerooms being supported (by Option 2). FIG. 4 sets forth the thirty-five different stowage aid types available for the user to choose from. As shown in FIG. 4, there are thirty-five permissible types of stowage systems currently coded into the inventive program. These thirty-five stowage aid types consist of twenty-eight U.S. Navy standard stowage aids, two pairs of special shipboard stowage systems (i.e., the "KSW—Automatic Seaborne Pallet Handling System" and the "Spacesaver Corp.—Shipboard Mobile Stowage System"), and an option to add up to three user-defined storage systems. Thus, three of these stowage systems are "user-defined" types, wherein the user can specify a similar stowage (e.g., bin or rack) system, and can then evaluate this in comparison with other, standard stowage systems. Thirty of these stowage systems are derived from the following US Navy Standard drawings: NAVSHIPS No. 804-4563102 (C, M, N and T Racks); NAVSHIPS No. 804-4563099 (J, K Racks & E, L Counters); NAVSHIPS No. 804-4563098 (B, F, O, I and J Racks); NAVSHIPS No. 805-1749068 (Bulk Stowage Telescopic Tube Batten).

Figure 7:
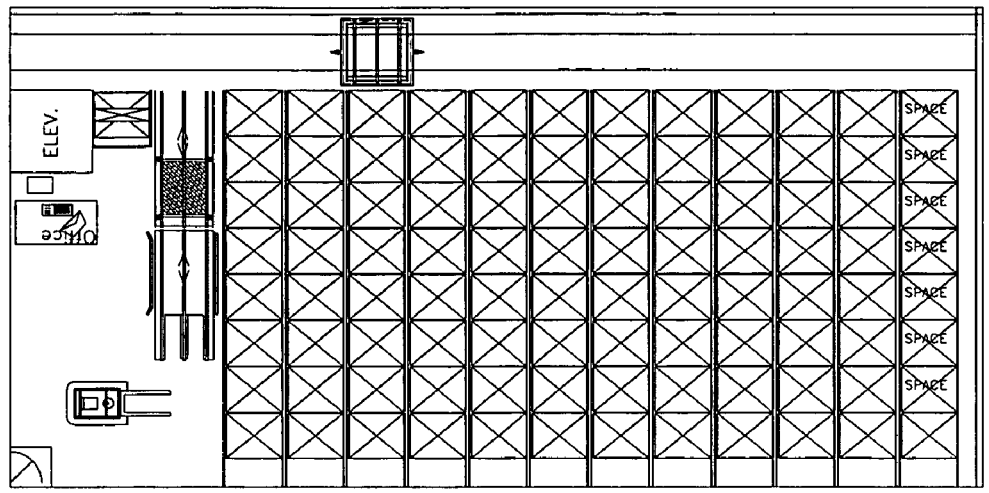
FIG. 7 and FIG. 8 are diagrammatic plan views of two typical compartment template layouts for a storeroom having an area of 2,500 square feet and a width-to-length ratio (W/L) of 0.5.
Figure 8:
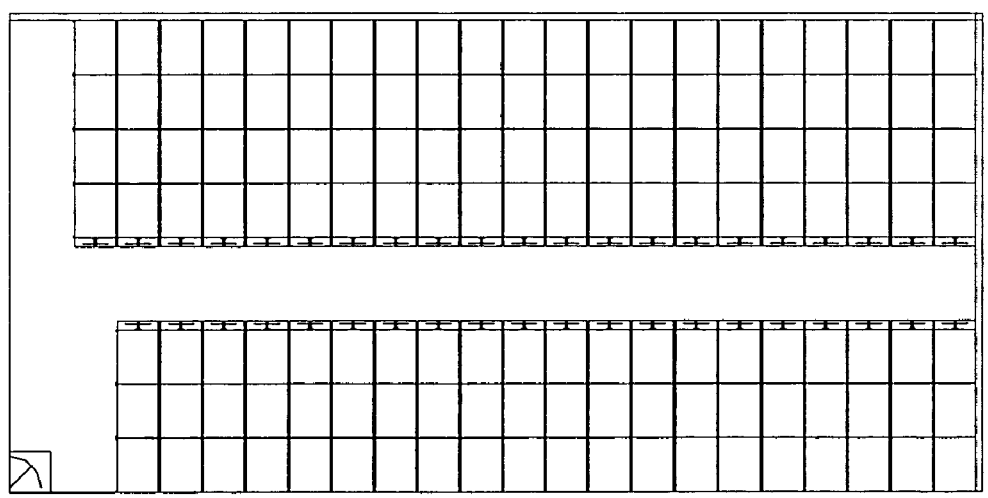

As noted above, the inventive program makes available to the user two "special" ("non-standard") stowage systems that do not fall into the category of either a rack or a bin. One of these two non-standard stowage systems, depicted in FIG. 7, is the "Automatic Seaborne Pallet Storage and Retrieval System," developed by the company KSW Systems (Joint Venture of Kaefer Isoliertechink, Sabroe Refrigeration and Westfalia Technologies), Westfalia-USA, York, Pa. The other of these two non-standard stowage systems, depicted in FIG. 8, is the "Shipboard Mobile Stowage System," developed by the company Spacesaver Corp., Ft. Atkins, Wis. Two variants of the KSW pallet stowage system are indicated as numerical listings "29" and "30" in FIG. 4. Two variants of the Spacesaver stowage system are indicated as numerical listings "31" and "32" in FIG. 4. Both of these special systems are considerably more complicated than the standard racks or bins, and their associated complexities are addressed in the inventive program prototype.

The inventive algorithms are designed to identify the storeroom gross area, wherein the gross area represents the area over and above that which is required to store the stowage items. The gross area includes passage aisles and other physical limitations the ship or the stowage aids present to area utilization. In the "CALC" mode the inventive program chooses the storage aid type or types based on GENSPEC recommendations (e.g., 30% B-BINS and 40% K-RACKS and 30% Dry BULK), based upon storeroom type. After the programs have been run once, the "CALC" option can be set to "GIVEN" mode and the user then has full control to select new storage aids or to adjust their corresponding percentages of utility.

Storerooms traditionally require significant personnel access; hence exists the need for passageways such as aisles and supply retrieval routes. These pathways are important factors in determining the extra space required to store something within a storeroom. Pull-out or stowage item retrieval paths can affect the locations of and spaces between the aisles. Requisite air circulation (e.g., dry or chilled) can also act to limit stowage arrangements.

Now referring to FIG. 5 and FIG. 6, the present inventor has studied the relative efficiencies of storing plural uniformly shaped objects (e.g., racks or bins) in various rectangular shaped storerooms. To a large extent the present inventor has experimentally assessed the accommodative efficiency variability by laying out a plurality of uniform storage aids in storerooms characterized by rectangular geometric areas of varying lengthwise and widthwise dimensions, at the same time complying with storeroom arrangement rules and guidelines such as mentioned hereinabove (e.g., minimum aisle clearance of three feet, one entrance per storeroom, six inches of clearance on two adjacent bulkheads for stiffeners/air flow, etc.). In so doing, as to each of numerous storerooms of various dimensions, the present inventor has estimated how many stowage aids (e.g., racks or bins) a particular storeroom could hold.

Vital to the inventive methodology is its understanding that, with respect to a storeroom of a given constant geometrical floor area, a storeroom's accommodative efficiency (e.g., with respect to objects such as stowage aids) is a function of the storeroom's lengthwise and widthwise dimensions. That is, if the geometric area (e.g., in square feet) of a storeroom were to be held constant, but the length-to-width ratio were allowed to change (e.g., in 10% increments), then the number of objects (e.g., stowage aids such as racks or bins) that can be accommodated by (fit inside) the storeroom would vary in accordance with the storeroom's length-to-width ratio. As illustrated in FIG. 5, the present invention describes the accommodative efficiencies of storerooms in terms of "Compartment Utilization Factors," or "CUFs." The inventive concept of "CUF" is elucidated by the inventive definitions set forth in FIG. 6.

In all thirty-two non-user-defined stowage aid systems shown in FIG. 4, the prototypical inventive program utilizes data that is based on the experimental outfitting of storerooms entirely with one stowage aid type. The compartment areas vary between 50 square feet and 4000 square feet, inclusive. The width-to-length ratios (W/L) vary between 0.1 and 1.0, inclusive, in ten percent increments. A width-to-length ratio of one indicates a square geometric area. The CUF data matrix shown in FIG. 5 is exemplary of this kind of CUF analysis, in this case pertaining to "K-RACK" stowage aids, viz., either "K-Rack-Aluminum") indicated as numerical listing "15" in FIG. 4) or "K-RACK-Steel" (indicated as numerical listing "16" in FIG. 4). It is emphasized that the data recorded inside a CUF data matrix such as that shown FIG. 4 are the CUF values experimentally found to correspond to various compartment configurations; the data values inside the data matrix are not the numbers of stowage aids that were able to be stored in each compartment configuration.

Again referring to FIG. 7 and FIG. 8, for relatively complicated stowage systems such as these, experimentally configuring even one of the gross storeroom areas at different compartment W/L ratios can be a laborious task. The present inventor in fact did this for every CUF indicated in FIG. 5, and repeated for all thirty-two defined stowage aids available in the inventive program prototype. Hence, the present inventor performed 130×32=4,160 layouts, not including variations to determine the maximum possible layout within each compartment configuration; this took hundreds of hours to develop. This empirical data would be of significantly less benefit to a practitioner if the present invention were practiced in the absence of computerization.

For the sake of illustration, let us suppose that a dry provision storeroom is outfitted so that 80% of the dry provisions are to be stored in "Dry-BULK" stowage aids, and the remaining 20% in "B-BIN" (either "B-BIN-36" or "B-BIN-24") stowage aids. "Dry-BULK," "B-BIN-36" and "B-BIN-24" are listed among many stowage aid types (systems) in FIG. 4. In this example, only two stowage aid systems are used, albeit the inventive program permits use of up to four possible stowage aid systems in each type of storeroom. An initial stores volume is estimated (in this case, by a factor times the number of accommodations). The volume of the supplies is split into 80% Dry-BULK and 20% B-BIN. The inventive program then loops through each solution based on this initial guess of how much in the way of supplies is actually being stored in each type of stowage aid system (i.e., Dry-BULK versus B-BIN). The user is assumed to have done some thinking in this regard and is not leaving reserve space in either stowage aid system; however, if the user were to assume the need for some reserve stowage space margin, he/she could increase the initial stowage volume of the space, as a user input.

Continuing with this example, in any event the inventive program will choose a L/W ratio for the dry provision storeroom based on the historical information available for similar storerooms found on similar ship types in the fleet. The CUFs for the two stowage systems selected (Dry-BULK and B-BIN) will be different because they enter the historical database of stowage aid CUFs (akin to the CUF data matrix which is depicted in FIG. 5) at different area estimates, based on the shapes and sizes of historical storerooms found on similar ships in the Navy. There is some error introduced, as the individual stowage aid components of the storeroom (in this example, Dry-BULK versus B-BIN) are not necessarily laid out in the same configuration (W/L ratio) as the selected historical W/L ratio; nevertheless, the amount of error found is largely insignificant and within acceptable limits in an early stage ship design. In truth, most storeroom types occupy several actual stowage spaces throughout the ship, and are usually optimized around one type of stowage aid in each compartment; this propensity tends to lessen the prediction error.

The above example illustrates how an inventive practitioner can link each of plural stowage systems to the same historical SSCS compartment W/L ratio, and nevertheless come up with realistic answers. Indeed, the correctness of the compartment W/L ratios that are being utilized plays a quite significant role in the estimation of the total area needed to be reserved for a particular storeroom. In inventive practice, a storeroom can be envisioned as containing plural (e.g., up to four) different stowage aids, each occupying a different percentage of the storeroom.

The present invention is not to be limited by the embodiments described or illustrated herein, which are given by way of example and not of limitation. Nor is the present invention to be limited in applicability to storage aboard marine vessels, as the present invention admits of practice relating to storage in association with multifarious structures, buildings, edifices and vehicles. Other embodiments of the present invention will be apparent to those skilled in the art from a consideration of this disclosure or from practice of the present invention disclosed herein. Various omissions, modifications and changes to the principles disclosed herein may be made by one skilled in the art without departing from the true scope and spirit of the present invention, which is indicated by the following claims.

What is claimed is:

1. A method for estimating shipboard stowage requirements, the method comprising:
    selecting plural stowage aid types, each said stowage aid type being characterized by a stowage aid net volume and a stowage aid footprint area;
    estimating the total volume of items to be stored in each said stowage aid type;
    estimating the total stowage aid deck area required for each said stowage aid type, said estimating of the total stowage aid deck area including calculating the estimated said total volume of items to be stored in each said stowage aid type, multiplied by the stowage aid footprint area, and divided by the stowage aid net volume;
    establishing three longitudinal ship sections, said longitudinal ship sections being the forward ship section, the mid ship section, and the aft ship section;
    selecting plural rectangular storeroom types, each said rectangular storeroom type being characterized by a storeroom area and lengthwise-widthwise storeroom dimensions, each said rectangular storeroom type differing from every other said rectangular storeroom type in at least one of said storeroom area and said lengthwise-widthwise storeroom dimensions;
    designating a sectional percentage for each said rectangular storeroom type with respect to each said longitudinal ship section, said sectional percentage being the percentage of total rectangular storerooms of said rectangular storeroom type that are in said longitudinal ship section;
    estimating a compartment utilization factor for each said rectangular storeroom type with respect to each said stowage aid type, said compartment utilization factor being indicative of the capacity of said rectangular storeroom type to contain at least one said stowage aid type, said estimating of said compartment utilization factor including calculating the net volume of said rectangular storeroom type, divided by the gross volume of said rectangular storeroom type; and
    estimating, by a computer, the total storeroom deck area required for each said rectangular storeroom type with respect to each said longitudinal ship section, said estimating of the total storeroom deck area including summing calculations of the estimated said total stowage aid deck area required for each said stowage aid type, multiplied by the designated said sectional percentage for each said rectangular storeroom type, and divided by the estimated said compartment utilization factor for each said rectangular storeroom type.

2. A computer program product comprising a computer readable storage medium having a computer readable program stored thereon for execution by a computer to perform a method for evaluating shipboard stowage requirements, said method including:
    selecting plural stowage aid types, each said stowage aid type being characterized by a stowage aid net volume and a stowage aid footprint area, each said stowage aid type having the character of at least one of a rack, a bin, a drawer unit, a shelf unit, shelving, a locker, a cabinet, a reel, a clip, a jackrod, a batten, and a pallet;
    estimating the total volume of items to be stored in each said stowage aid type;
    estimating the total stowage aid deck area required for each said stowage aid type, said estimating of the total stowage aid deck area including calculating the estimated said total volume of items to be stored in each said stowage aid type, multiplied by the stowage aid footprint area, and divided by the stowage aid net volume;
    establishing three longitudinal ship sections, said longitudinal ship sections being the forward ship section, the mid ship section, and the aft ship section;
    selecting plural rectangular storeroom types, each said rectangular storeroom type being characterized by a storeroom area and lengthwise-widthwise storeroom dimensions, each said rectangular storeroom type differing from every other said rectangular storeroom type in at least one of said storeroom area and said lengthwise-widthwise storeroom dimensions;
    designating a sectional percentage for each said rectangular storeroom type with respect to each said longitudinal ship section, said sectional percentage being the percentage of total rectangular storerooms of said rectangular storeroom type that are in said longitudinal ship section;
    estimating a compartment utilization factor for each said rectangular storeroom type with respect to each said stowage aid type, said compartment utilization factor being indicative of the capacity of said rectangular storeroom type to contain at least one said stowage aid type, said estimating of said compartment utilization factor including calculating the net volume of said rectangular storeroom type, divided by the gross volume of said rectangular storeroom type; and
    estimating the total storeroom deck area required for each said rectangular storeroom type with respect to each said longitudinal ship section, said estimating of the total storeroom deck area including summing calculations of the estimated said total stowage aid deck area required for each said stowage aid type, multiplied by the designated said sectional percentage for each said rectangular storeroom type, and divided by the estimated said compartment utilization factor for each said rectangular storeroom type.

3. The method of claim 1 wherein each said stowage aid type has the character of at least one of a rack, a bin, a drawer unit, a shelf unit, shelving, a locker, a cabinet, a reel, a clip, a jackrod, a batten, and a pallet.

4. The method of claim 1 wherein the method is for assisting in the design of a ship, and wherein the method further comprises conveying or making available, to at least one participant in the design of a ship, information indicative of the estimated said total storeroom deck area required for each said rectangular storeroom type with respect to each said longitudinal ship section.

5. The method of claim 1 wherein the method is a computer-implemented method, and wherein a computer is used for performing said selecting of said stowage aid types, said estimating of said total volume of said items to be stored, said estimating of said total stowage aid deck area required for each said stowage aid type, said establishing of said three longitudinal ship sections, said selecting of said rectangular storeroom types, said designating of said sectional percentage for each said rectangular storeroom type, said estimating of said compartment utilization factor for each said rectangular storeroom type with respect to each said stowage aid type, and said estimating of said total storeroom deck area required for each said rectangular storeroom type with respect to each said longitudinal ship section.

6. The method of claim 5 wherein the method is for assisting in the design of a ship, and wherein the method further comprises conveying or making available, to at least one participant in the design of a ship, information indicative of the estimated said total storeroom deck area required for each said rectangular storeroom type with respect to each said longitudinal ship section.

7. The method of claim 5, further comprising displaying information indicative of the estimated said total storeroom deck area required for each said rectangular storeroom type with respect to each said longitudinal ship section.

8. The method of claim 7 wherein the method is for assisting in the design of a ship, and wherein the method further comprises conveying or making available, to at least one participant in the design of a ship, information indicative of the estimated said total storeroom deck area required for each said rectangular storeroom type with respect to each said longitudinal ship section.

9. The method of claim 1 wherein at least two said rectangular storeroom types are characterized by:
   the same said storeroom area;
   different said lengthwise-widthwise storeroom dimensions; and
   different said compartment utilization factors with respect to the same said stowage aid type.

10. The method of claim 1, further comprising estimating the total number of said rectangular storerooms of each said rectangular storeroom type with respect to each said longitudinal ship section, said estimating of the total number of said rectangular storerooms including calculating the estimated said total storeroom deck area required for each said rectangular storeroom type with respect to each said longitudinal ship section, divided by said storeroom area.

11. The method of claim 10, further comprising upwardly adjusting the estimated said total storeroom deck area required for each said rectangular storeroom type with respect to each said longitudinal ship section, said upward adjustment including taking into consideration respective entranceways associated with at least some said rectangular storerooms of each said rectangular storeroom type.

12. The computer program product of claim 2 wherein each said stowage aid type has the character of at least one of a rack, a bin, a drawer unit, a shelf unit, shelving, a locker, a cabinet, a reel, a clip, a jackrod, a batten, and a pallet.

13. The computer program product of claim 2 wherein at least two said rectangular storeroom types are characterized by:
   the same said storeroom area;
   different said lengthwise-widthwise storeroom dimensions; and
   different said compartment utilization factors with respect to the same said stowage aid type.

14. The computer program product of claim 2, said method further including estimating the total number of said rectangular storerooms of each said rectangular storeroom type with respect to each said longitudinal ship section, said estimating of the total number of said rectangular storerooms including calculating the estimated said total storeroom deck area required for each said rectangular storeroom type with respect to each said longitudinal ship section, divided by said storeroom area.

15. The computer program product of claim 14, said method further including upwardly adjusting the estimated said total storeroom deck area required for each said rectangular storeroom type with respect to each said longitudinal ship section, said upward adjustment including taking into consideration respective entranceways associated with at least some said rectangular storerooms of each said rectangular storeroom type.

16. A system comprising one or more computers configured to execute computer program logic that when executed causes the one or more computers to:
   select plural stowage aid types, each said stowage aid type being characterized by a stowage aid net volume and a stowage aid footprint area, each said stowage aid type having the character of at least one of a rack, a bin, a drawer unit, a shelf unit, shelving, a locker, a cabinet, a reel, a clip, a jackrod, a batten, and a pallet;
   estimate the total volume of items to be stored in each said stowage aid type;
   estimate the total stowage aid deck area required for each said stowage aid type, said estimating of the total stowage aid deck area including calculating the estimated said total volume of items to be stored in each said stowage aid type, multiplied by the stowage aid footprint area, and divided by the stowage aid net volume;
   establish three longitudinal ship sections, said longitudinal ship sections being the forward ship section, the mid ship section, and the aft ship section;
   select plural rectangular storeroom types, each said rectangular storeroom type being characterized by a storeroom area and lengthwise-widthwise storeroom dimensions, each said rectangular storeroom type differing from every other said rectangular storeroom type in at least one of said storeroom area and said lengthwise-widthwise storeroom dimensions;
   designate a sectional percentage for each said rectangular storeroom type with respect to each said longitudinal ship section, said sectional percentage being the percentage of total rectangular storerooms of said rectangular storeroom type that are in said longitudinal ship section;
   estimate a compartment utilization factor for each said rectangular storeroom type with respect to each said stowage aid type, said compartment utilization factor being indicative of the capacity of said rectangular storeroom type to contain at least one said stowage aid type, said estimating of said compartment utilization factor including calculating the net volume of said rectangular storeroom type, divided by the gross volume of said rectangular storeroom type; and
   estimate the total storeroom deck area required for each said rectangular storeroom type with respect to each said longitudinal ship section, said estimating of the total storeroom deck area including summing calculations of the estimated said total stowage aid deck area required for each said stowage aid type, multiplied by the designated said sectional percentage for each said rectangular storeroom type, and divided by the estimated said compartment utilization factor for each said rectangular storeroom type.

17. The system of claim 16 wherein each said stowage aid type has the character of at least one of a rack, a bin, a drawer unit, a shelf unit, shelving, a locker, a cabinet, a reel, a clip, a jackrod, a batten, and a pallet.

18. The system of claim 16 wherein at least two said rectangular storeroom types are characterized by:
- the same said storeroom area;
- different said lengthwise-widthwise storeroom dimensions; and
- different said compartment utilization factors with respect to the same said stowage aid type.

19. The system of claim 16 wherein said computer program logic when executed causes the one or more computers to estimate the total number of said rectangular storerooms of each said rectangular storeroom type with respect to each said longitudinal ship section, said estimating of the total number of said rectangular storerooms including calculating the estimated said total storeroom deck area required for each said rectangular storeroom type with respect to each said longitudinal ship section, divided by said storeroom area.

20. The system of claim 19 wherein said computer program logic when executed causes the one or more computers to upwardly adjust the estimated said total storeroom deck area required for each said rectangular storeroom type with respect to each said longitudinal ship section, said upward adjustment including taking into consideration respective entranceways associated with at least some said rectangular storerooms of each said rectangular storeroom type.

* * * * *